US012713085B2

(12) United States Patent
Rangan et al.

(10) Patent No.: US 12,713,085 B2
(45) Date of Patent: Aug. 18, 2026

(54) GENERATING EVENT COMMENTARY IN VIDEOS USING AI MODELS

(71) Applicant: NVIDIA Corporation, Santa Clara, CA (US)

(72) Inventors: Ram Rangan, Tamil Nadu (IN); Deep Shekhar, Bangalore (IN); Siddharth Sharma, San Jose, CA (US); Marc Seth Blackstein, Portland, OR (US)

(73) Assignee: NVIDIA Corporation, Santa Clara, CA (US)

( * ) Notice: Subject to any disclaimer, the term of this patent is extended or adjusted under 35 U.S.C. 154(b) by 0 days.

(21) Appl. No.: 18/620,998

(22) Filed: Mar. 28, 2024

(65) Prior Publication Data

US 2025/0310585 A1 Oct. 2, 2025

(51) Int. Cl.

| | |
|---|---|
| ***H04N 21/266*** | (2011.01) |
| ***G06T 13/20*** | (2011.01) |
| ***G06T 13/40*** | (2011.01) |
| ***G06V 30/10*** | (2022.01) |
| ***G10L 13/08*** | (2013.01) |
| ***G10L 15/00*** | (2013.01) |
| ***H04N 21/488*** | (2011.01) |

(52) U.S. Cl.

CPC ..... *H04N 21/26603* (2013.01); *G06T 13/205* (2013.01); *G06T 13/40* (2013.01); *G06V 30/10* (2022.01); *G10L 13/08* (2013.01); *G10L 15/00* (2013.01); *H04N 21/4884* (2013.01)

(58) Field of Classification Search

None

See application file for complete search history.

(56) References Cited

U.S. PATENT DOCUMENTS

| | | | | |
|---|---|---|---|---|
| 12,283,291 | B1 * | 4/2025 | Sarfati | H04N 21/8106 |
| 2008/0129825 | A1 * | 6/2008 | DeAngelis | H04N 23/661 348/E7.086 |
| 2022/0189173 | A1 * | 6/2022 | Zhou | G06V 10/80 |
| 2024/0005520 | A1 * | 1/2024 | Bower, III | G06T 7/215 |
| 2024/0394755 | A1 * | 11/2024 | Ding | G06V 10/70 |
| 2025/0124689 | A1 * | 4/2025 | Williams | G06V 10/764 |
| 2025/0139160 | A1 * | 5/2025 | Miller | H04N 21/251 |

FOREIGN PATENT DOCUMENTS

JP 2025049065 A * 4/2025

OTHER PUBLICATIONS

U.S. Appl. No. 63/468,180 filed on May 22, 2023. (Year: 2023).*

* cited by examiner

*Primary Examiner* — Junior O Mendoza

(74) *Attorney, Agent, or Firm* — Lowenstein Sandler LLP

(57) ABSTRACT

Disclosed are apparatuses, systems, and techniques for automatically generating commentary to videos that capture sporting activities, computer games, artistic events, political rallies, security-sensitive scenes, and/or any other actions. The techniques include processing a video segment that includes a plurality of video frames, to obtain a description of one or more objects pictured in the video segment and generating, using the obtained description, a prompt for a language model (LM). The techniques further include causing the LM to process the prompt to generate a commentary about an action performed by the one or more objects over a time interval associated with the plurality of video frames.

20 Claims, 11 Drawing Sheets

GENERATING EVENT COMMENTARY IN VIDEOS USING AI MODELS

TECHNICAL FIELD

At least one embodiment pertains to content generation using artificial intelligence (AI) systems. For example, at least one embodiment pertains to automatic generation of descriptions of action videos using AI systems and techniques that include language models.

BACKGROUND

Well-trained language models—such as large language models (LLMs)—are capable of supporting conversations in natural language, understanding speaker intents and emotions, explaining complex topics, generating new texts upon receiving suitable prompts, providing recommendations regarding topics of interest to a user, processing image, audio, and/or other data types, and/or performing other functions. LLMs typically undergo self-supervised training on massive amounts of text data and/or other data types, depending on the embodiment, and learn to predict next and/or missing tokens (which may correspond to sub-words, symbols, words, etc.) in a phrase/sentence, detect intent and/or sentiment of a human speaker, determine if two sentences are related or unrelated, and/or perform other basic language tasks. Following the initial training, LLMs often undergo instructional (prompt-based) supervised fine-tuning that causes LLMs to acquire more in-depth language proficiency and/or master more specialized tasks. Supervised fine-tuning includes using learning prompts (questions, hints, etc.) that are accompanied by example texts (e.g., answers, sample essays, etc.) serving as training ground truth. In reinforcement fine-tuning, a human evaluator assigns grades indicative of a degree to which the generated text resembles human-produced texts.

DETAILED DESCRIPTION

Figure 1A:
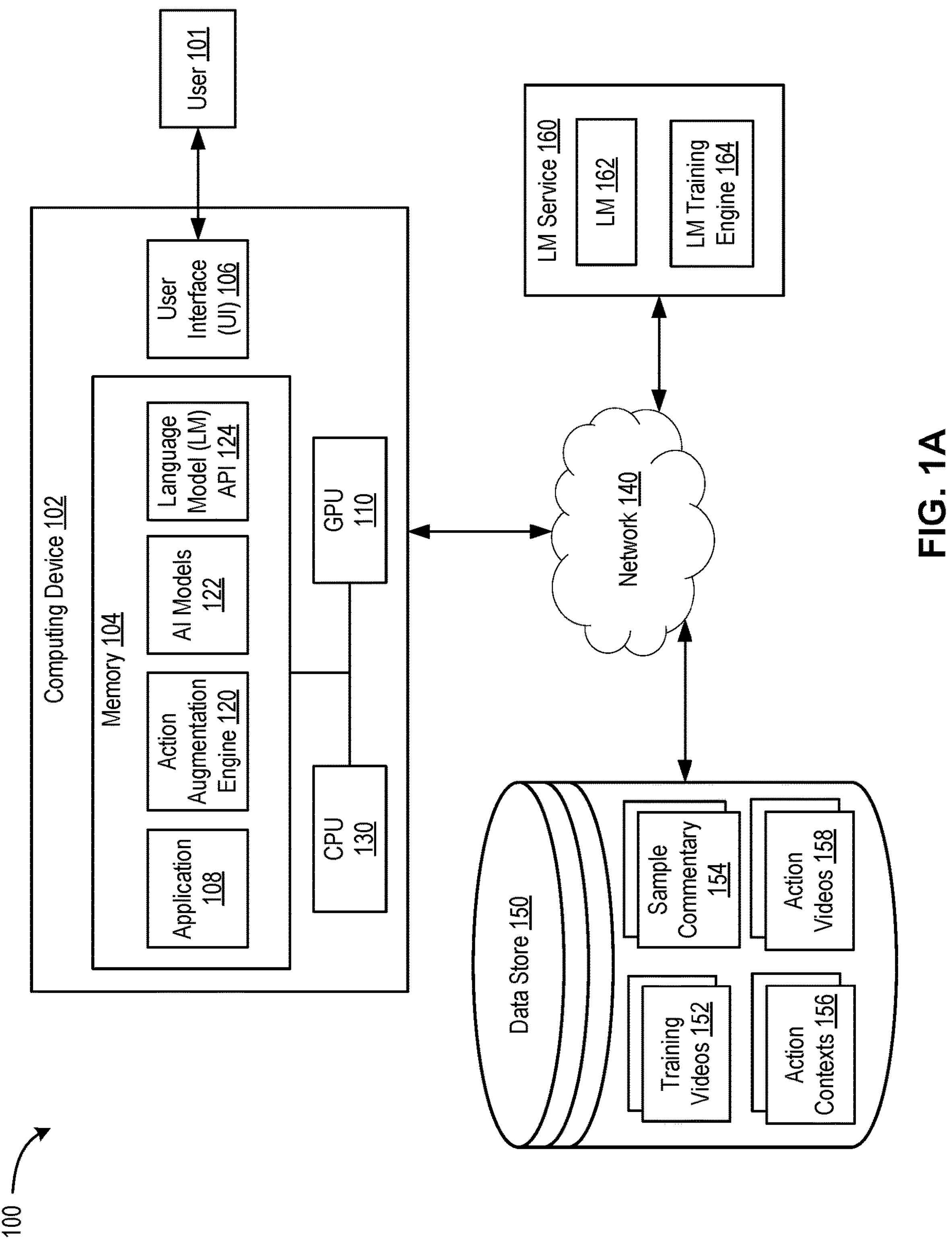
FIG. 1A is a block diagram of an example computer architecture capable of training and deploying AI systems for generation of commentary to actions captured in videos, according to at least one embodiment.

Professional sports events are typically accompanied by live commentary and post-game and intermission reviews by sports journalists and experts, which often include former players providing insights and analysis of most notable game moments. Such reviews and commentary greatly improve user experiences, understanding of the sports, and interest in future games and sporting events. A similar commentary is rarely available in sports or other activities involving amateurs, e.g., a high-school football game, a local soccer league, a tennis tournament, a dancing competition, and/or the like, as cost considerations usually make professional-level commentary economically unviable in these activities. Non-professional sports events, however, can be watched and followed by a substantial number of players and spectators, e.g., family members, friends, and/or the like. Similarly, computer games can draw multiple spectators who can be following a game's actions over a network or via a local computing device. In some instances, sporting or gaming actions can later be rewatched by the players or other people. Players can be interested in identifying specific episodes of the game, e.g., for the purpose of analyzing and improving performance. A lack of commentary or some form of episode indexing can make finding relevant game actions difficult.

Aspects and embodiments of the present disclosure address these and other challenges facing non-professional sporting and gaming audiences by providing for systems and techniques that leverage one or more data processing modalities of AI models to generate live and/or offline commentary, close captioning, action indexing, and/or other support for various actions that may occur in the context of sporting games, computer games, artistic competitions, and/or any other events where participants and/or spectators may benefit from such commentary and/or other supporting description. In some embodiments, an action augmentation engine (AAE) may access a stream of video frames capturing an action, which may include any sequence of images and sounds that change with time. For example, an action may include an athletic event, an artistic event, a political event, a street festival, a video game, a driving or piloting (autonomous or driver-control) mission, and/or the like. The video frames may be provided in the form of a live feed or as a recorded and stored video file. The AAE may sample the video frames with some set (e.g., empirically, depending on an expected rate of action for the event) frequency and provide sampled frames to one or more AI models, including a computer vision model. The computer vision model may output textual description of objects identified in sampled frames, including types and locations of objects, e.g., location of a ball on the soccer field, positions of players relative to the ball and to a goal, and/or the like. The description of the objects and a change in the objects' locations and appearance across multiple times (frames) may be included into a prompt to a language model (LM). The prompt may further include instructions to the LM to generate a commentary about the action that the objects perform or in which the objects participate. The LM may process the prompt and generate a text that includes the commentary for the action performed by the objects, e.g., "player #68 on the red team crossed the blue line and passed the puck to player #19 who wristed the puck into the net above the right shoulder of the white team goalie." In some embodiments, the prompt may further include a text that is captured by a character recognition model in the sampled frames, e.g., a content of the scoreboard showing the current score "white team 3, red team 2" of the game, positions of cars racing on a track (e.g., in a computer racing game or a corporate go-karting event), words that other players (or non-player characters, NPCs) utter in a computer game, and/or the like. In some embodiments, the prompt may also include a speech and/or sound recognition model that captures words uttered by players (e.g., "come on, that should have been a minor penalty for high-sticking") or describes the nature of the sounds (e.g., "loud shouting from spectators"). In some embodiments, the prompt may include an action context and/or game rules that inform the LM how various pieces of the input information are to be understood. In some embodiments, the action context may be used to precondition the LM prior to inputting prompts into the LM.

Text generated by the LM model in response to the prompts may be used in a variety of ways. For example, a particular action episode may be mapped to specific frames, e.g., using timestamps associated with the frames featuring the action and added to the frames as closed captioning. In some embodiments, the commentary may be compiled as a game log and stored in computer memory (or communicated over a network). In some instances, the full log of commentary may be used in an additional prompt into the LM with an instruction to generate a concise (e.g., one or several paragraphs-long) game description or a digest of the most notable action episodes. In some embodiments, the commentary may be streamed live together with the video feed in real (or near-real) time. The LM or a separate keyword search software may perform indexing of the action, by identifying instances and times of the most eventful episodes, e.g., odd-player rushes, turnovers of possession, goals, car overtaking maneuvers, collisions, scenes of intense battle fighting with NPCs, and/or the like. In some embodiments, the text commentary generated by the LM may be processed by a text-to-speech conversion model generating an audio file that is added to (e.g., overlaid or superimposed on) the video of the action for storage or live streaming. In some embodiments, the text-to-speech processing may include an audio-to-face conversion that generates a picture or video of a commentator speaking the text of the commentary, with facial features of the commentator aligned with pronunciation of the spoken words.

The advantages of the disclosed embodiments include the ability to generate fast, efficient, and inexpensive automated descriptions of actions, including but not limited to live and/or offline commentary, closed captioning, indexing, and/or the like, for a wide variety of actions that may occur in any sporting, artistic, political (e.g., a rally or a caucus), industrial, traffic, medical (e.g., a surgical operation), security (e.g., surveillance) context, and/or in any other settings where a description of a video is desirable.

FIG. 1A is a block diagram of an example computer architecture 100 capable of training and deploying AI systems for generation of commentary to actions captured in videos, according to at least one embodiment. As depicted in FIG. 1A, computer architecture 100 may include a computing device 102, a data store 150, and an LM service 160 connected via a network 140. Network 140 may be a public network (e.g., the Internet), a private network (e.g., a local area network (LAN), or wide area network (WAN)), a wireless network, a personal area network (PAN), a combination thereof, and/or another network type.

Computing device 102 may be implemented on a desktop computer, a laptop computer, a smartphone, a tablet computer, a server, a wearable device, a virtual/augmented/mixed reality headset or head-up display, a digital avatar or chatbot kiosk, an in-vehicle infotainment computing device, and/or any suitable computing device capable of performing the techniques described herein.

Computing device 102 may include a memory 104 (e.g., one or more memory devices or units) communicatively coupled to one or more processing devices, such as one or more graphics processing units (GPU) 110, one or more central processing units (CPU) 130, one or more data processing units (DPU), one or more parallel processing units (PPUs), and/or other processing devices (e.g., field-programmable gate arrays (FPGAs), application-specific integrated circuits (ASICs), and/or the like). Memory 104 may include a read-only memory (ROM), a flash memory, a dynamic random-access memory (DRAM), such as synchronous DRAM (SDRAM), a static memory, such as static random-access memory (SRAM), and/or some other memory capable of storing digital data. Memory 104 may store application 108, action augmentation engine (AAE) 120, one or more support AI models 122, and an LM application programming interface (API) 124. In some embodiments, the LM may be located on a different computing device/server, e.g., on a cloud-based server of LM service 160. LM API 124 may be downloaded from LM service 160 and installed on computing device 102 to facilitate communication with the LM 162 remotely provided by LM service 160.

Application 108 may be any application capable of processing, streaming, or rendering video frames of any action that includes time-varying positions, states, and/or relative associations of one or more objects, e.g., players, NPCs, scenery (e.g., racing track layout), and/or the like. For example, application 108 may be a video player application decoding and running a video footage of an athletic event, a camera application capturing live feed of an environment of an autonomous vehicle, a gaming application rendering synthetic video frames of a gaming scene, and/or the like.

AI models 122 may include one or more computer vision models (e.g., object recognition models, action recognition models, sentiment detection models, and/or the like), optical character recognition (OCR) models, speech-to-text models, text-to-speech models, speech-to-face models, and/or the like. Although shown in FIG. 1A as being deployed on computing device 102, in some embodiments, any, some or all AI models 122 may be deployed on a remote server (not shown in FIG. 1A) or on a server of LM service 160. Various AI models 122 may be deployed, e.g. by AAE 120, during various stages of commentary generation, as disclosed in more detail below in conjunction with FIG. 3 and FIG. 4.

In some embodiments, LM 162 may be a large language model, e.g., a model with at least 100K of learnable parameters, provided by LM service 160, which may be a cloud service, a subscription service, and/or some combination thereof, e.g., a service that makes trained models available to customers, such as owner or operator of computing device 102. LM 162 may be trained by LM training engine 164. In some embodiments, LM 162 may be a model that has been pretrained and deployed by a separate entity. For example, LM 162 may be trained in multiple stages. Initially, training engine 164 may train LM 162 to capture syntax and semantics of human language, e.g., by training to predict a next, a previous, and/or a missing word in a sequence of words (e.g., one or more sentences of a human speech or text). LM 162 may be further trained using training data containing a large number of texts, such as human dialogues, newspaper texts, magazine texts, book texts, web-based texts, and/or any other texts. Since ground truth for such training is embedded in the texts themselves, training engine 164 may use such texts for self-supervised training of LM 162. This teaches LM 162 how to carry out a conversation with a user (a human user or another computer) in a natural language in a manner that closely resembles a dialogue with a human speaker, including understanding the user's intent and responding in ways that the user expects from a conversational partner.

Following the initial self-supervised training, LM training engine 164 may implement a supervised fine-tuning of LM 162 to teach LM 162 more specialized language skills, including expertise in a particular field of knowledge, e.g., sports, video games, automotive technology, patient care, and/or the like. During fine-tuning, LM 162 may be trained using training videos 152, e.g., recordings of sports and/or video games with sample commentary 154 produced by experts, e.g., historical commentary by broadcasters of professional sports, commentary made during high school/college games, and/or other examples of action commentary. LM 162 may be trained to respond to developer-designed or computer-designed (e.g., by AAE 120) prompts that include a description of sporting and/or gaming scenes (e.g., positions of various players in the scenes) and instructions to generate a commentary about the actions occurring in the scenes. Sample commentary 154 may be used as ground truth against which LM outputs are evaluated, e.g., to estimate a degree to which commentaries produced by LM 162 emulate or resemble sample commentary 154. Evaluation of the responses produced by LM 162 may be performed by a developer, an expert in the field of relevant action types, or a layperson viewer, gamer, etc., e.g., using a suitable evaluation scale indicative of effectiveness of the LM output. Additional inputs into LM 162 during training may include action contexts 156, such as rules for the games, descriptions of video game interfaces, e.g., scoreboards in team games, leaderboards in racing games, information boards in combat games, and/or the like.

In some embodiments, training engine 164 may facilitate any, some, or all stages of training of LM 162 and/or AI models 122. For example, training engine 164 may oversee self-supervised training stage, focused on development of general language proficiency, and then pass pretrained LM 162 to another entity for additional fine-tuning of LM 162, e.g., computing device 102 that performs fine-tuning of LM 162 to generate commentaries. In some instances, LM 162 may receive pretrained LM 162 from another entity and perform fine-tuning of LM 162. In some instances, training engine 164 may perform both pretraining of LM 162 and field-specific fine-tuning of LM 162.

LM 162 and/or AI models 122 may be implemented using neural networks with a large number (e.g., billions) of artificial neurons. In at least one embodiment, LM 162 and/or AI models 122, may be implemented as deep learning neural networks having multiple levels of linear and non-linear operations. For example, LM 162 and/or AI models 122 may include convolutional neural networks, recurrent neural networks, fully-connected neural networks, long short-term memory (LSTM) neural networks, neural networks with attention, e.g., transformer neural networks, a combination of a convolutional network and one or more transformers (a conformer), and/or neural networks of other types. In at least one embodiment, LM 162 and/or AI models 122 may include multiple neurons, with an individual neuron receiving its input from other neurons and/or from an external source and producing an output by applying an activation function to the sum of weighted (using trainable weights) inputs and, possibly, a bias value. In at least one embodiment, LM 162 and/or AI models 122 may include multiple neurons arranged in layers, including an input layer, one or more hidden layers, and/or an output layer. Neurons from adjacent layers may be connected by weighted edges.

Initially, parameters (e.g., edge weights and biases) of LM 162 and/or AI models 122 may be assigned some starting (e.g., random) values. For various training videos 152, LM training engine 164 may cause LM 162 to generate training output(s). LM training engine 164 may then compare training output(s) with the desired target output. The resulting error or mismatch, e.g., the difference between the target output(s) and the training output(s), may be backpropagated through various neural layers of LM 162 and/or AI models 122, and the weights and biases of LM 162 and/or AI models 122 may be adjusted to make the training outputs closer to the target (e.g., sample commentary 154) outputs. This adjustment may be repeated until the output error for a given video input 152 satisfies a predetermined condition (e.g., falls below a predetermined value). Subsequently, a different training video 152 may be selected, a new training output generated, and a new series of adjustments implemented, until LM 162 (and/or other AI models 122) is trained to a target degree of accuracy or until LM 162 (and/or other AI models 122) converges to a limit of its architecture-determined accuracy. In some embodiments, computing device 102 may train multiple LMs 162 for multiple tasks, e.g., multiple different fields of knowledge and/or type of gaming activities.

In some embodiments, training videos 152, sample commentary 154, action contexts 156, and/or other data may be stored in data store 150 accessible to computing device 102 via a bus, interconnect, and/or the like, or (as shown in FIG. 1A) via network 140. Data store 150 may include persistent storage and may be hosted by one or more storage devices, such as main memory, magnetic or optical storage disks, tapes, or hard drives, network-attached storage (NAS), storage area network (SAN), and so forth. Although depicted as separate from computing device 102 and/or LM service 160, in at least some embodiments, data store 150 may be a part of computing device 102 or LM service 160. In at least some embodiments, data store 150 may be a network-attached file server, while in other embodiments, data store 150 may be some other type of persistent storage, such as an object-oriented database, a relational database, and so forth, that may be hosted computing device 102 and/or LM service 160 or one or more different machines coupled to computing device 102 and/or LM service 160. Data store 150 may further store various action videos 158 that LM 162 may be processing after deployment (inference videos that LM 162 has not previously processed in training).

The trained LM 162 and/or AI models 122 may be deployed on any suitable machine for generation of inference commentaries using new sporting and/or gaming scenes not previously processed by LM 162 and/or AI models 122. Deployment of LM 162 and/or AI models 122 may be on to a rackmount server, a router computer, a personal computer, a laptop computer, a tablet computer, a desktop computer, a media center, or any combination thereof. Operations of LM 162 and/or various AI models 122 may be orchestrated by AAE 120. Commentaries generated for various actions may be stored in memory 104 and/or provided to a user 101. User 101 may be an individual user, a collective user (e.g., a group of subscribers, family members, a gaming community, etc.), and/or the like.

UI 106 may include one or more devices of various modalities, e.g., a keyboard, a touchscreen, a touchpad, a writing pad, a graphical interface, a mouse, a stylus, and/or any other pointing device capable of selecting words/phrases that are displayed on a screen, and/or some other suitable device. In some embodiments, UI 106 may include an audio device, e.g., a combination of a microphone and a speaker, a video device, such as a digital camera to capture an image or a sequence of two or more images (video frames). In some embodiments, text, speech, and/or video input devices may be integrated together (e.g., into a smartphone, tablet computer, desktop computer, and/or the like).

Multiple variations of the architecture 100 illustrated in FIG. 1A are within the scope of this disclosure. In various embodiments, any, some or all of the UI 106, application 108, action augmentation engine 120, AI models 122, LM API 124, and/or LM 162 may be run, individually or jointly, on the same computing device or on any number of different devices.

Figure 1B:
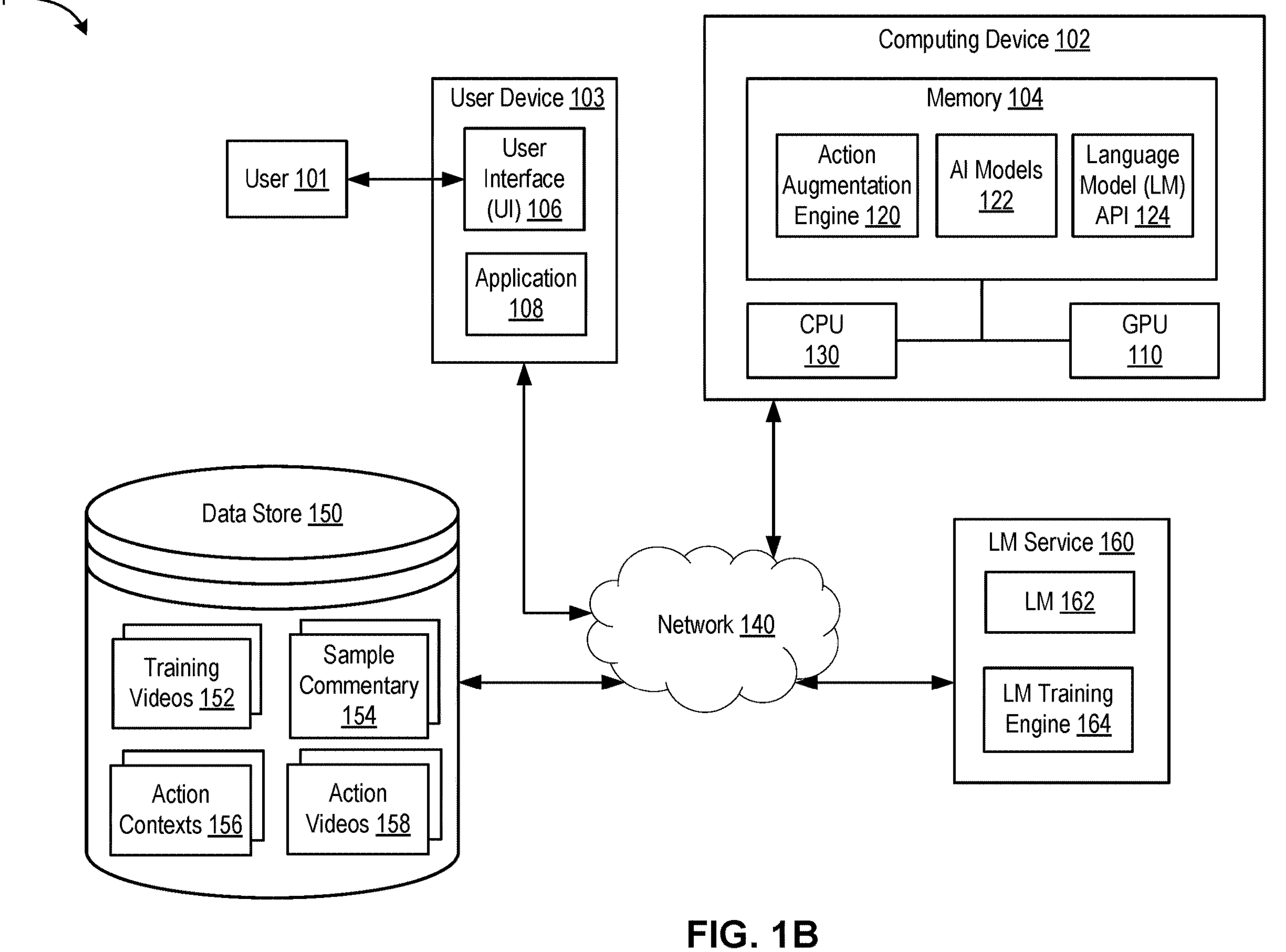
FIG. 1B is a block diagram of another example computer architecture capable of training and deploying AI systems for generation of commentary to actions captured in videos, according to at least one embodiment.

FIG. 1B is a block diagram of another example computer architecture 111 capable of training and deploying AI systems for generation of commentary to actions captured in videos, according to at least one embodiment. In the example computing architecture 111, UI 106 and application 108 are executed on a user device 103, e.g., a personal computer or a gamer's console of user 101. Although shown as being connected to computing device 102 via network 140, in some embodiments, user device 103 may be connected to computing device 102 (e.g., a server computer) via a different network or a local connection. In some embodiments, UI 106 may be located on (e.g., split between) multiple devices. For example, game controls may be accessed by user 101 via a gaming console portion of UI 106 while the audio and video feed from the game may be streamed on a separate screen in a different room, e.g., together with the AI-generated commentary (audio and/or closed captioning commentary).

Figure 2:
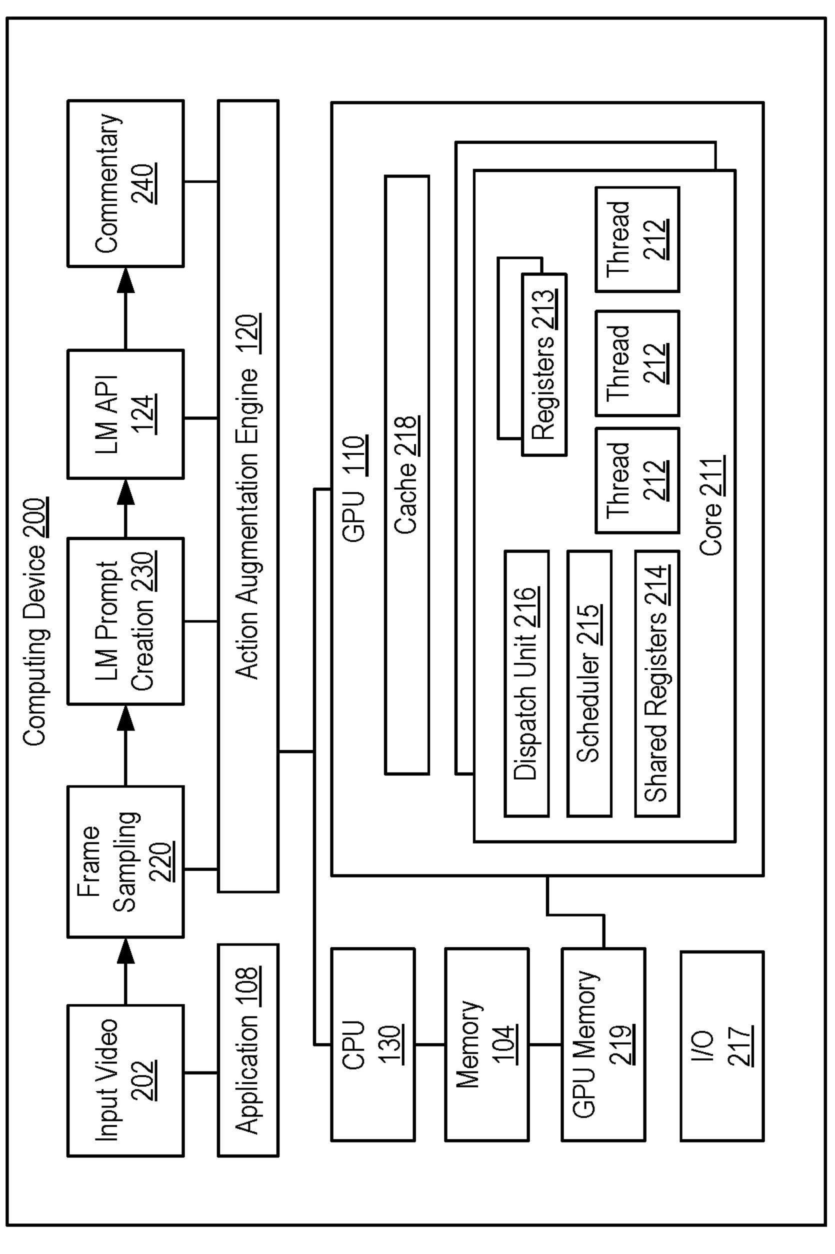
FIG. 2 illustrates an example computing device that supports generation of commentary to actions captured in videos, according to at least one embodiment.

FIG. 2 illustrates an example computing device 200 that supports generation of commentary to actions captured in videos, according to at least one embodiment. In at least one embodiment, computing device 200 may be a part of computing device 102. In at least one embodiment, computing device 200 may include AAE 120 that operates in conjunction with application 108, which renders, retrieves, or otherwise obtains an input video 202, which may be a training video (e.g., one of training videos 152, with reference to FIG. 1A), an inference video (e.g., one of action videos 158), and/or the like. AAE 120 may perform frame sampling 220 to sample frames of the input video 202, e.g., at a specified sampling rate, such as 0.5 Hz, 1 Hz, etc. Sampled frames may be processed using various AI models (as disclosed below in conjunction with FIG. 3) and by LM prompt creation 230 that generates prompts for input into the LM, which may be instantiated on computing device 200 or on some other server or device. Prompts may be provided to the LM via LM API 124 for processing. The LM may generate and return commentary 240 to computing device 200.

Operations of application 108 and various modules operating in conjunction with AAE 120, and/or other software/firmware instantiated on computing device 200 may be executed using one or more GPUs 110, one or more CPUs 130, one or more parallel processing units (PPUs) or accelerators, such as a deep learning accelerator, data processing units (DPUs), and/or the like. In at least one embodiment, a GPU 110 includes multiple cores 211, each core being capable of executing multiple threads 212. Each core may run multiple threads 212 concurrently (e.g., in parallel). In at least one embodiment, threads 212 may have access to registers 213. Registers 213 may be thread-specific registers with access to a register restricted to a respective thread. Additionally, shared registers 214 may be accessed by one or more (e.g., all) threads of the core. In at least one embodiment, each core 211 may include a scheduler 215 to distribute computational tasks and processes among different threads 212 of core 211. A dispatch unit 216 may implement scheduled tasks on appropriate threads using correct private registers 213 and shared registers 214. Computing device 200 may include input/output component(s) 217 to facilitate exchange of information with one or more users or developers.

In at least one embodiment, GPU 110 may have a (high-speed) cache 218, access to which may be shared by multiple cores 211. Furthermore, computing device 200 may include a GPU memory 219 where GPU 110 may store intermediate and/or final results (outputs) of various computations performed by GPU 110. After completion of a particular task, GPU 110 (or CPU 130) may move the output to (main) memory 104. In at least one embodiment, CPU 130 may execute processes that involve serial computational tasks whereas GPU 110 may execute tasks (such as multiplication of inputs of a neural node by weights and adding biases) that are amenable to parallel processing.

The systems and methods described herein may be used for a variety of purposes, by way of example and without limitation, for machine control, machine locomotion, machine driving, synthetic data generation, model training, perception, augmented reality, virtual reality, mixed reality, robotics, security and surveillance, simulation and digital twinning, autonomous or semi-autonomous machine applications, deep learning, environment simulation, data center processing, conversational AI, generative AI, light transport simulation (e.g., ray-tracing, path tracing, etc.), collaborative content creation for 3D assets, cloud computing and/or any other suitable applications.

Disclosed embodiments may be comprised in a variety of different systems such as automotive systems (e.g., a control system for an autonomous or semi-autonomous machine, a perception system for an autonomous or semi-autonomous machine), systems implemented using a robot, aerial systems, medical systems, boating systems, smart area monitoring systems, systems for performing deep learning operations, systems for performing simulation operations, systems for performing digital twin operations, systems implemented using an edge device, systems for generating or presenting at least one of augmented reality content, virtual reality content, mixed reality content, systems incorporating one or more virtual machines (VMs), systems for performing synthetic data generation operations, systems implemented at least partially in a data center, systems for performing generative AI operations, systems for performing conversational AI operations, systems for performing light transport simulation, systems for performing collaborative content creation for 3D assets, systems implementing one or more language models, such as large language models (LLMs) (which may process text, voice, image, and/or other data types to generate outputs in one or more formats), systems implemented at least partially using cloud computing resources, and/or other types of systems.

Figure 3:
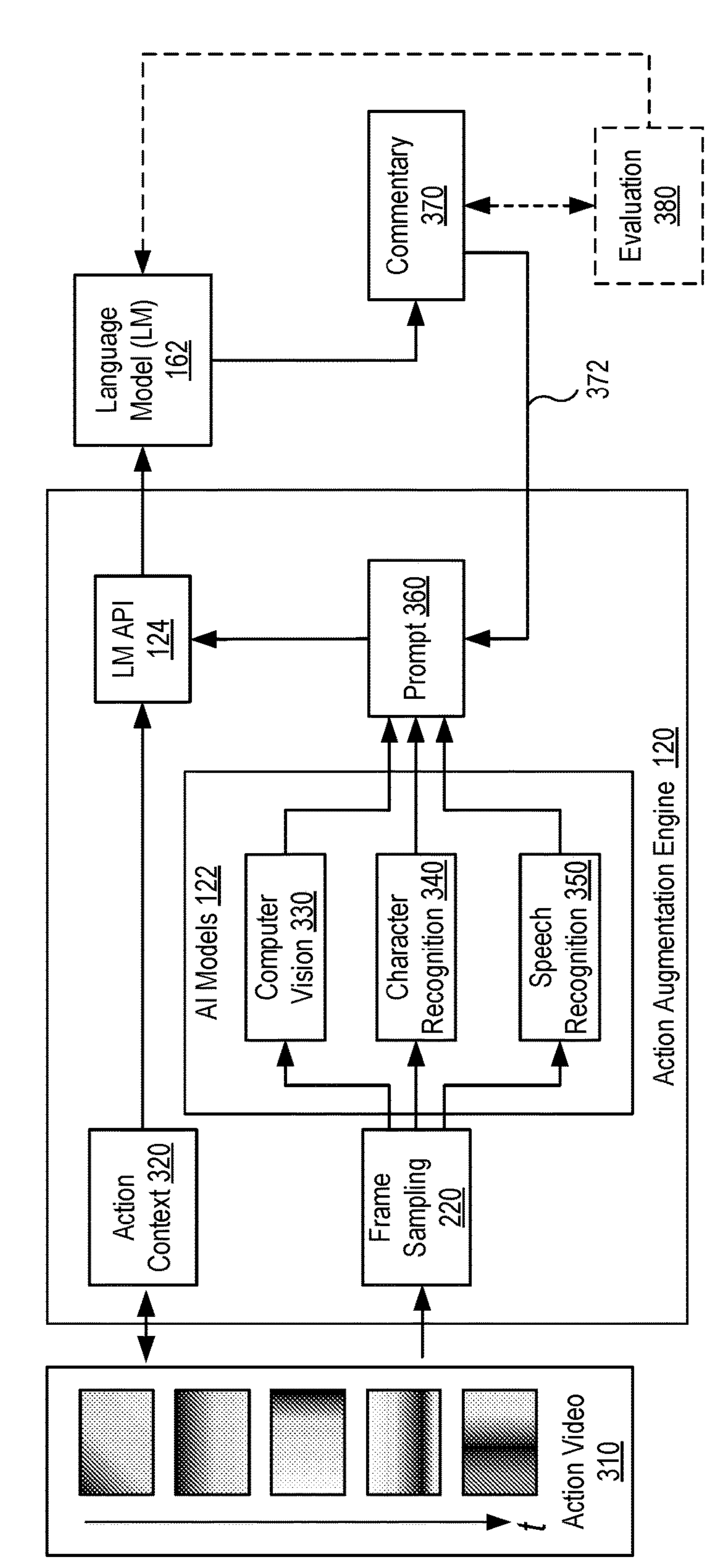
FIG. 3 illustrates an example data flow for generation of commentary to actions captured in videos, according to at least one embodiment.

FIG. 3 illustrates an example data flow 300 for generation of commentary to actions captured in videos, according to at least one embodiment. Operations illustrated in FIG. 3 may be performed by AAE 120. In some embodiments, operations illustrated in FIG. 3 may be performed as part of training (e.g., fine-tuning) of LM 162 using historical videos and/or as part of commentary generation for new action videos. In some embodiments, operations illustrated in FIG. 3 may be performed as part of training of any, some, or all AI models 122. The instances of data flow 300 performed as part of training of LM 162 and/or AI models 122 may be associated with supervised training, self-supervised training, reinforcement training, unsupervised training, or any combination thereof.

As schematically illustrated in FIG. 3, an action video 310 may include a sequence of time-ordered frames in any suitable format, e.g., a raw video format or a compressed video format, e.g., H.264, H.265, VP8, VP9, AV1, and/or the like. Action video 310 may capture any action for which a commentary may be desired, e.g., an athletic game, tournament, practice etc., a computer or video game with one or multiple players, an artistic performance, a political rally or march, a street festival, and/or any other event. Action video 310 may capture a driving mission of an autonomous vehicle or a vehicle equipped with a driver-assist technology. Action video 310 may be a traffic monitoring video, a security surveillance video, and/or the like. Action video 310 may be a patient monitoring video filmed in an in-patient medical facility, a nursing home, a surveillance video filmed in a children (day-care) facility, or any other series of images capturing an evolving interaction of animate and/or inanimate objects.

Action video 310 may be or include a live feed or a file previously recorded and retrieved from a memory device. Action video 310 may have any suitable frame rate, e.g., 30 Hz, 60 Hz, etc. Frame sampling 220 may select frames of action video 310 at any set frequency, e.g., 1 Hz, 2 Hz, and/or the like. Sampling frequency may be set in view of the speed of the action and can be higher for higher-speed actions (e.g., a hockey game, a boxing match, etc.) than in lower-speed actions (e.g., a soccer game, a 5 k running competition, etc.). Frame sampling 220 may feed sampled frames to one or more AI models 122. AI models 122 may include a computer vision model 330, which may include an object recognition model, an action detection model, an interaction detection model, and/or the like. Computer vision model 330 may process the sampled frames, individually or together, to identify various objects present in the frames, type of action performed by the objects in the frames, types of interactions between such objects, and/or the like. In some embodiments, computer vision model 330 may include one or more neural networks trained to process input images. The neural networks may include convolutional neural networks, fully connected neural networks and/or the like. In some embodiments, computer vision model 330 may have a long short-term memory (LSTM) architecture and may be trained to process images (frames) sequentially. In some embodiments, computer vision model 330 may have an attention-based architecture (e.g., transformer architecture) and may be trained to process two or more images concurrently. For various identified objects in the frames, computer vision model 330 may output a type of an object (e.g., player, non-player, ball, puck, goal, game field marking, buildings, structures, weapons caches, obstacles, etc.), locations of the objects (e.g., bounding boxes for different frames), states of the objects, velocities of the objects, and/or the like. The data outputted by computer vision model 330 may be in a text format, e.g.

Object ID ‘23’: red team player, #11
State: run, ball possession
Motion: Start BB [−128, 75; 64, 83]; End BB [314, 88; 65, 81]

indicating that a player having a tracking ID 23 is identified as player #11 on the red team ran across the field of view while maintaining possession of the ball, from an initial position (in the first input frame) identified by the coordinates X=−128, Y=+75 of the center of the bounding box with width ΔX=64 and height ΔY=83 to a final position (in the last input frame) identified by the coordinates X=+314, Y=+88 of the center of the bounding box with width ΔX=65 and height ΔY=81. In some embodiments, computer vision model 330 or a separate tracking software may track motion of identified objects across those frames in which the respective objects are visible. When a given object leaves the field of view (e.g., a player of a video game exits a room where the object is currently located), the track for the object may be temporarily suspended and resumed when the object reenters the field of view.

Information generated by computer vision model 330 for various identified objects may be included in prompt 360 for LM 162. Prompt 360 may include instructions to LM 162 to generate commentary about the actions of the objects specified in prompt 360. Prompt 360 may be provided to LM 162 via LM API 124. Trained LM 162 may generate commentary 370 for the action video 310. In some embodiments, information included in prompt 360 may correspond to a certain portion of action video 310 of a predetermined length (duration), e.g., from several seconds to tens of minutes or more. In some embodiments, instead of processing a long prompt at once, LM 162 may process multiple shorter prompts and then fuse multiple outputs into commentary 370.

In some embodiments, prompt 360 may be augmented with an action context 320 that informs LM 162 about a type of action that the identified objects perform, e.g., a sports activity, a computer/video game, a driving environment of an autonomous vehicle, and/or the like. Action context 320 may further identify rules of the activity, e.g., a description of the game of hockey, an explanation of how various information panels are to be read and understood, and/or any other applicable information that may be useful for LM 162 in generating commentary 370.

In some embodiments, action context 320 may be input into LM 162 contemporaneously with prompt 360. In some embodiments, action context 320 may be processed by LM 162 before one or more prompts 360 are provided to LM 162, e.g., to prime or pre-condition LM 162 prior to receiving specific prompts about action video(s) 310.

Action context 320 may also be used even with activities for which LM 162 has not been pre-trained, e.g., in situations of recently released video games, home automation, closed circuit television (CCTV) systems deployed by a particular family/household, and/or the like. Action context 320 may deploy retrieval-augmented generation (RAG), which fetches knowledge and terminology relevant for a particular activity from a text store or database of vectors (features, embeddings, etc.) that can be understood by LM 162. The retrieved action context 320 may be used prior to inputting the first prompt 360 (e.g., to pre-condition LM 162 for the new activity) or together with the first prompt 360.

In some embodiments, prompt 360 may include an output of a character recognition model 340, which may be a trained OCR model. Character recognition model 340 may segment various regions of frames of action video 310 that contain depictions of words, sentences, or any alphanumeric characters, and may apply one or more algorithms to convert the images into recognized symbols of text. The recognized texts may include words spoken by players or NPCs, content of scoreboards, leaderboards, and/or the like and may be included in prompt 360 with indications of specific frames (or timestamps) in which the corresponding texts appear.

In some embodiments, prompt 360 may include an output of a speech recognition model 350. Speech recognition model 350 may process a sound recording associated with action video 310. In some embodiments, the sound may first be pre-processed, e.g., denoised, filtered, enhanced, and converted into a set of suitable spectrograms, e.g., mel-spectrograms. Spectrograms corresponding to silent portions (or portions that include only noise) of the sound recording may be eliminated, and the remaining spectrograms (appropriately timestamped) may be inputted into speech recognition model 350 that outputs a text transcript of the utterances spoken by various actors in the action video 310.

In some embodiments, as sampled frames of action video 310 are being processed by one or more AI models 122, AAE 120 may compare the outputs of the AI models with the outputs obtained for one or more previously sampled frames to identify things that changed (e.g., locations of the players/characters and/or other objects, content of score/information boards, sound of the racing car engine, and/or the like). AAE 120 may then emphasize the identified changes in the next prompt 360, e.g., by explicitly flagging the changes for LM 162, listing the changes towards the front (or end) of prompt 360, and/or by using any other suitable prompt engineering techniques.

LM 162 may use prompt 360 and action context to generate commentary 370. As indicated schematically, by the dashed portion of FIG. 3, during training of LM 162 a training commentary 370 may undergo evaluation 380 to determine a degree to which the training commentary 370 resembles a human expert-generated commentary. The results of the evaluation may be used to modify one or more parameters of LM 162 (as indicated schematically with the dashed arrow). During inference processing, commentary 370 may be used in one or more ways illustrated in FIG. 4.

In some embodiments, LM 162 may be a general-purpose LM (trained on a diverse set of training texts. In some embodiments, LM 162 may be a general-purpose LM fine-tuned with texts associated with a specific activity. In some embodiments, LM 162 may be a dedicated LM trained using activity-specific texts.

In some embodiments, as indicated with connection 372, commentary 370 or some portion thereof may be included in subsequent prompts 360. For example, a certain number N of prior dialog pairs (prompt-response, e.g., prompt-commentary, pairs) may be included in the next, N+1th, prompt 360. The prior dialog pairs may be associated with the same instance of the activity, e.g., dialog pairs generated during the same episode of a computer game or athletic event, one or more previous instances of the same or a similar-type activity (e.g., past games/events), or both.

In some embodiments, AAE 120 may buffer sampled frames of a certain time interval $T_1$, e.g., 3-10 seconds of action video 310 (or some other empirically selected interval) to accumulate events and developments that may deserve a commentary and then process the sampled frames from the time interval $T_1$, e.g., as disclosed above. AAE 120 may then move to the next time intervals $T_2$, $T_3$, . . . . In some instances, the intervals may be of the same duration. In some embodiments, the time intervals need not be of a fixed duration and may be shorter for high-intensity actions and longer for lower-intensity actions. In some embodiments, a next time interval $T_{j+1}$ may commence even before time interval $T_j$ has concluded, if some significant event occurs. For example, in a car racing game, if time interval $T_j$ began prior to a start of the race (e.g., the moment the racing lights turn green), AAE 120 may end the time interval $T_j$ and begin a new time interval $T_{j+1}$ once the race has begun, to prioritize and request commentary associated with this important event. The commentary 370 generated for the time interval $T_{j+1}$ may then be mapped to the starting timestamp of this interval.

In some embodiments, AAE 120 may detect, e.g., based on outputs of AI models 122 and/or commentary 370 generated by LM 162, periods of relatively uneventful actions and include more general (less specific to immediate action in the video) commentary about the activity (game, event, etc.) into such periods. For example, AAE 120 may have access to a collection of activity-related topics of interest to a viewer, e.g., the history of the activity, current standings in a league associated with the sport/game, explanations of the rules of the sport/game, and/or the like. AAE 120 may generate a request for LM 162 to generate such a general commentary (e.g., by randomly selecting one or more topics of interest) and include such a request in prompt 360. In some embodiments, AAE 120 may also include, in prompt 360, a request for LM 162 to select a topic of interest and to produce a general commentary on the selected topic. In some embodiments, multiple (two or more) instances of LM 162 may be used to generate commentary 370, e.g., with a first LM prompted to generate a question for a second LM and cause the second LM to answer that question. Such a dialogue may continue until AAE 120 detects that the character and/or pace of the action in the video has increased and generates prompt 360 designed to elicit commentary 370 about the immediate action that is occurring in the video.

In some embodiments, e.g., in games that allow external inputs, commentary 370 may be routed back to one or more NPCs in the game. This may provide an enhanced immersion experience for players since the players may now be able to communicate (e.g., using voice or text) with various NPCs about the game's activities. This may happen during the game's built-in periods of inaction (rest) or by the player(s) idling in the middle of a gameplay while taking time to talk to the NPCs. Gamer's questions and responses may be collected by AAE 120 (e.g., using speech recognition model 350) and included in prompts 360. Such gamer-NPC dialogues may be both entertaining and informative for the player(s). the NPC-attributed commentary 370 may be configured (e.g., via prompt engineering) to include information or advice about strategic aspects of the game, missed opportunities that have occurred in the game, and/or any other feedback that may potentially help the gamer to improve gaming performance in the upcoming episodes of the game.

In some embodiments, commentary 370 may differ by tone and tenor, e.g., as may be controlled by AAE 120 and/or the viewer. For example, prompt 360 may include a request to provide commentary 370 from the perspective of a commentator with a particular personality, e.g., funny, ironic, jovial, sarcastic, enthusiastic, a fan of a certain team/player, and/or the like. Prompts 360 generated at different times may include requests for commentary 370 from different personality types.

Figure 4:
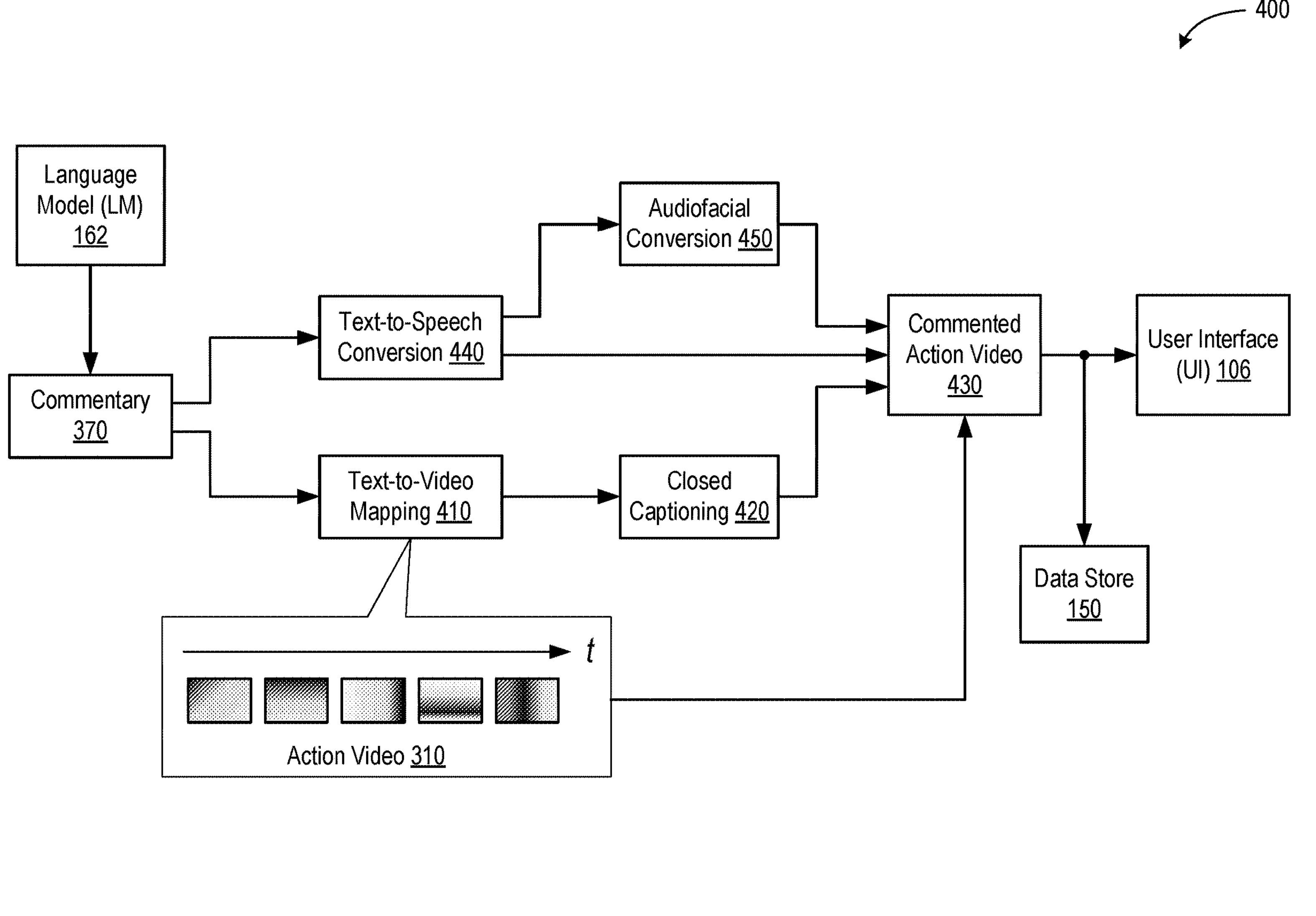
FIG. 4 illustrates an example data flow depicting integration of AI-generated commentaries into action videos, according to at least one embodiment.

FIG. 4 illustrates an example data flow 400 depicting integration of AI-generated commentaries into action videos, according to at least one embodiment. As illustrated in FIG. 4, text commentary 370 generated using LM 162 in response to text prompts of the action augmentation engine may undergo text-to-video mapping 410. For example, various action videos 310, e.g., portions of a larger video, processed by LM 162 (as disclosed above in conjunction with FIG. 3) can be timestamped, e.g., with the starting times or both the starting times and the durations of the videos (in the instances where LM 162 is used to process variable-length videos), and the timestamps may be used to associate with specific portions of LM-generated commentary 370 to respective portions of the original (uncropped) video of the action. Closed captioning may then segment commentary 370 into portions of suitable length (e.g., ranging from several words to several sentences) and superimpose those portions of the original video using the timestamps to generate a commented action video 430.

In some embodiments, commentary 370 may be processed by a text-to-speech conversion model 440 that reads out commentary 370 in a human-like voice and/or generates an audio file with the spoken version of the commentary. The audio file may be mapped to action video 310 in a substantially similar fashion as described above in conjunction with text-to-video mapping 410 and closed captioning 420 (e.g., using timestamps) and appended to the video file or otherwise associated with the video file to obtain commented action video 430. For example, spoken words may be synchronized with those portions of the original video whose processing generated the respective parts of commentary 370. In some embodiments, the generated audio file may be combined with the closed captioning 420. In some embodiments, the audio file may be included in commented action video 430 in lieu of the closed captioning 420. In some embodiments, any of the audio file or closed captioning may be optionally turned on/off, e.g., by a viewer/listener of the commented action video 430.

In some embodiments, AAE 120 may specify, in prompt 360, a limit (e.g., word limit, character limit, etc.) for the commentary 370. In some embodiments, the limit may depend on the duration of the time interval $T_j$, e.g., with shorter/longer time intervals being associated with lower/higher commentary limits. In some instances, commentary 370 may nonetheless exceed an amount of speech that can be uttered during the time interval $T_j$ (e.g., when processed by text-to-speech conversion model 440). Such overflow commentary may overlap with a subsequent notable event taking place during the time interval $T_{j+1}$. In such instances, a processing logic performing text-to-speech conversion may cut-off commentary generated for the time interval $T_j$ while introducing additional utterances (in the same voice or a different voice) marking a turn in the monologue or conversation, e.g., "Oh, wait!" or "Wait, wait!" or something similar to the same effect. The interrupting commentator may then comment on the events taking place during the new time interval $T_{j+1}$. Outputs of text-to-speech conversion model 440 enhanced with such spontaneity may appear to be more realistic and/or entertaining to the viewer.

In some embodiments, the text-to-speech conversion 440 may be followed by an audio-facial conversion 450 that generates facial expressions, including lip, jaw, eye, etc., movements of a person—commentator—uttering the corresponding commentary. A picture or video of a commentator may be displayed within a window superimposed on commented action video 430. In some embodiments, the commentator display window may be turned on or off by the viewer.

The commented action video 430 may be stored in data store 150 (or any other non-transient computer memory). The commented action video 430 may also be streamed (to the viewer/listener/reader/etc.) via user interface 106, e.g., a display, a screen, an audio device, and/or any combination thereof. The streamed commented video may include any, some, or all of the closed captioning, audio commentary, or audiovisual commentary.

Figure 5:
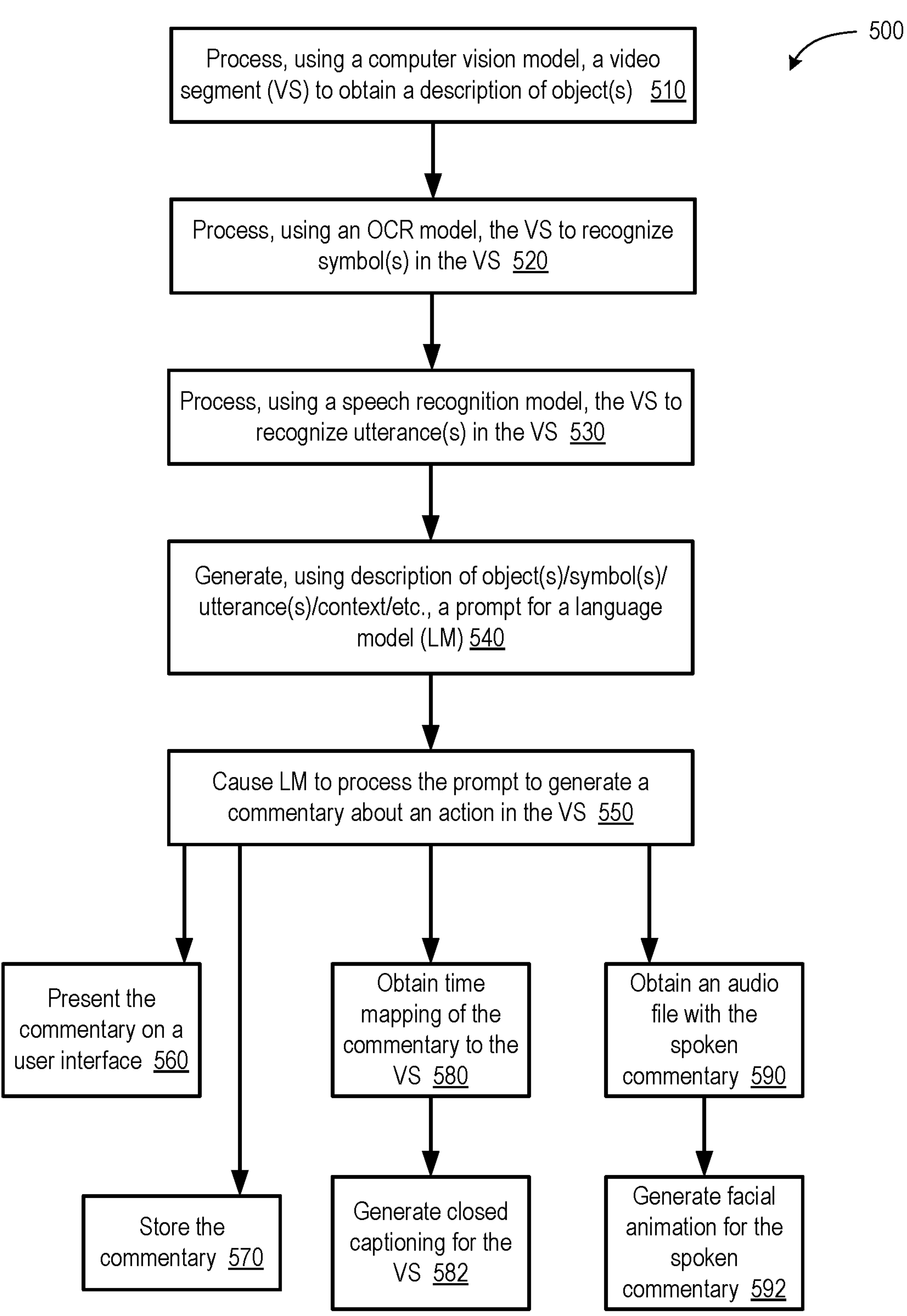
FIG. 5 is a flow diagram of an example method of deploying AI systems to generate automated commentaries to actions captured in videos, according to at least one embodiment.
Figure 6:
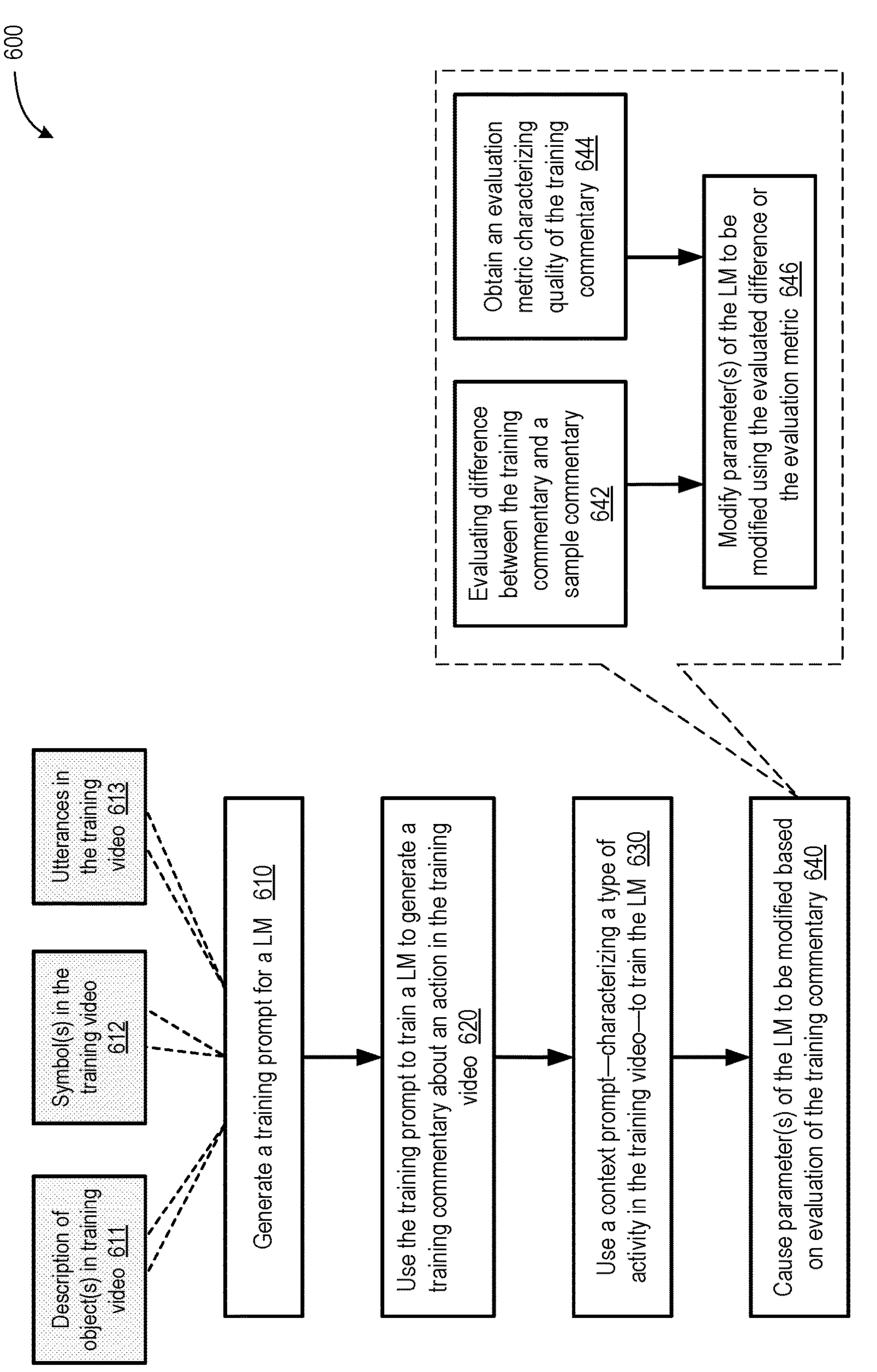
FIG. 6 is a flow diagram of an example method of training AI systems to generate automated commentaries to actions captured in videos, according to at least one embodiment.

FIGS. 5 and 6 illustrate example methods 500 and 600 directed to training and deployment of trained AI systems to generate automated commentaries to actions captured in videos. Methods 500 and 600 may be used in the context of provisioning of video recording and/or streaming services associated with actions of any suitable types that occur in any type of a setting being recorded by (or under control of) any (e.g., professional or amateur) human videographer and/or one or more automated video recording systems. In at least one embodiment, methods 500 and/or 600 may be performed using processing units of computing device 102 of FIG. 1A, user device 103 of FIG. 1B, and/or computing device 200 of FIG. 2. In at least one embodiment, processing units performing methods 500 and/or 600 may be executing instructions stored on a non-transient computer-readable storage media. In at least one embodiment, methods 500 and/or 600 may be performed using multiple processing threads (e.g., CPU threads and/or GPU threads), with individual threads executing one or more individual functions, routines, subroutines, or operations of the methods. In at least one embodiment, processing threads implementing any of methods 500 and/or 600 may be synchronized (e.g., using semaphores, critical sections, and/or other thread synchronization mechanisms). Alternatively, processing threads implementing any of methods 500 and/or 600 may be executed asynchronously with respect to each other. Various operations of any of methods 500 and/or 600 may be performed in a different order compared with the order shown in FIGS. 5 and 6. Some operations of any of methods 500 and/or 600 may be performed concurrently with other operations. In at least one embodiment, one or more operations shown in FIGS. 5 and 6 may not always be performed.

FIG. 5 is a flow diagram of an example method 500 of deploying AI systems to generate automated commentaries to actions captured in videos, according to at least one embodiment. Method 500 may be performed using one or more processing units (e.g., CPUs, GPUs, accelerators, PPUs, DPUs, etc.) of computing device 102, user device 103, and/or computing device 200, the processing units including (or communicating with) one or more memory devices. At block 510, method 500 may include processing a video segment. The video segment may include a plurality of video frames. The video segment may be associated with an athletic activity, a computer game, an artistic event, an activity captured by a home automation system, an activity captured by a security surveillance system, an activity associated with one or more vulnerable persons (e.g., a hospital CCTV, home CCTV, assisted living facility CCTV, and/or the like), an activity associated with an automotive environment, and/or the like or any combination thereof.

The processing of the video segment may be performed using a computer vision model, e.g., a model (or a set of models) capable of detection of objects in the video segment, motion of the objects, character of interaction between the objects, and/or the like. The computer vision model may process the video segment to obtain a description of one or more objects pictured in the video segment. In some embodiments, the description of the one or more objects may include a description of locations of the one or more objects, a description of motion of the one or more objects, a description of action performed by the one or more objects pictured in the video segment, a description of interaction between the one or more objects pictured in the video segment, and/or the like, or any combination thereof.

In some embodiments, at block 520, method 500 may include processing, using an optical character recognition (OCR) model, the video segment to recognize one or more symbols pictured in the video segment. In some embodiments, at block 530 method 500 may include processing, using a speech recognition model, the video segment to recognize one or more utterances captured in the video segment.

At block 540, method 500 may continue with generating, using the obtained description, a prompt for a language model (LM). In those embodiments where the video segment is processed using the OCR model and/or the speech recognition model, the prompt for the LM may further be generated using the one or more recognized utterances in the video segment and/or the one or more recognized symbols in the video segment.

In some embodiments, the prompt may be engineered using various additional techniques. For example, method 500 may include obtaining a representation of a type of activity captured in the video segment, e.g., rules of a game, description of the scenery/interfaces, and/or the like, and/or any other context. In some instances, the obtained representation may be appending to the prompt for the LM. In some embodiments, the obtained representation may be processed by the LM prior to processing of the prompt generated based on the video segment.

In some embodiments, the prompt for the LM may include an indication of a length limit (e.g., in words, characters, an equivalent duration of the spoken version of the commentary), and/or the like. In some embodiments, the prompt for the LM may include one or more previous instances of the commentary generated for a type of activity pictured in the video segment, which may be generated for one or more previous video segments of the same game/event or for other instances of similar games/events.

At block 550, method 500 may continue with causing the LM to process the prompt to generate a commentary about an action performed by the one or more objects over a time interval associated with the plurality of video frames. The generated commentary may be presented on a user interface, as indicated with block 560 and/or stored in a computer memory, as indicated with block 570. In some embodiments, method 500 may include, at block 580, obtaining a mapping of the generated commentary to one or more timestamps of the video segment and, at block 582, generating, using the obtained mapping, a closed captioning for the video segment. In some embodiments, method 500 may include, at block 590, applying the generated commentary to a text-to-speech conversion model to obtain an audio file that includes a spoken commentary about the action performed by the one or more objects. In some embodiments, as indicated with block 592, method 500 may include generating a facial animation for the spoken commentary.

FIG. 6 is a flow diagram of an example method 600 of training AI systems to generate automated commentaries to actions captured in videos, according to at least one embodiment. Method 500 may be performed using one or more processing units (e.g., CPUs, GPUs, accelerators, PPUs, DPUs, etc.) of computing device 102, user device 103, and/or computing device 200, the processing units including (or communicating with) one or more memory devices.

At block 610, method 600 may include generating a training prompt for a language model (LM). The training prompt may include a description of one or more objects (block 611) present in a video segment, which includes a plurality of video frames. The object(s) may be identified using a computer vision model. The description of the object(s) may include a description of locations of the object(s), a description of motion of the object(s), a description of action performed by the object(s), a description of interaction between the object(s), and/or the like. In some embodiments, the training prompt may further include one or more symbols (block 612) recognized within the video segment. The one or more symbols may be recognized using a trained OCR model. In some embodiments, the training prompt may further include one or more speech utterances (block 613) recognized in the video segment using a speech recognition model.

At block 620, method 600 may include using the training prompt as an input into the LM to cause the LM to generate a training commentary about an action performed by the one or more objects over a time interval associated with the plurality of video frames.

In some embodiments, as indicated with block 630, operations of method 600 may include using a context prompt to train the LM. For example, method 600 may include obtaining a representation of a type of activity captured in the video segment. The obtained representation may be included in the training prompt for the LM or an additional training prompt for the LM. In some embodiments, the additional training prompt may be processed by the LM prior to the LM processing the training prompt (e.g., as part of informing the LM about the type of activity in the video segment).

At block 640, method 600 may continue with causing one or more parameters of the LM to be modified based at least on the training commentary. As illustrated with the callout portion of FIG. 6, causing the one or more parameters of the LM to be modified may include evaluating a difference between the training commentary and a sample commentary (bock 642), and/or obtaining an evaluation metric characterizing a quality of the training commentary (block 644). For example, the sample commentary may be created by a human expert or some person with a knowledge of the activity and/or commenting ability/experience. Evaluating the difference between the training commentary and the sample commentary may include application of a loss function to evaluate a difference between the words of the training commentary and the words of the sample commentary. The evaluation metric may include any numerical score, e.g., a "1-5" or "0-10" ranking, for the quality of the commentary or any suitable scheme that may be used by a human (expert or non-expert layperson) evaluator, e.g., using one or more such grades as "accurate," "inaccurate," "confusing," "boring," "entertaining," "funny," "poor," "good," "excellent," and/or the like. As indicated with block 646, operations of method 600 may include causing the one or more parameters of the LM to be modified, e.g., based on at least one of the evaluated difference or the evaluation metric. For example, the LM may generate additional training commentaries (for the same training prompt) until the quality of the training commentary improves, e.g., as determined based on the evaluated difference and/or the obtained evaluation metric.

The systems and methods described herein may be used for a variety of purposes, by way of example and without limitation, for performing one or more operations with respect to machine control, machine locomotion, machine driving, synthetic data generation, model training, perception, augmented reality, virtual reality, mixed reality, robotics, security and surveillance, simulation and digital twinning, autonomous or semi-autonomous machine applications, deep learning, environment simulation, object or actor simulation and/or digital twinning, data center processing, conversational AI, light transport simulation (e.g., ray-tracing, path tracing, etc.), collaborative content creation for 3D assets, cloud computing and/or any other suitable applications.

Disclosed embodiments may be comprised in a variety of different systems such as automotive systems (e.g., an in-vehicle infotainment system for an autonomous or semi-autonomous machine), systems implemented using a robot, aerial systems, medial systems, boating systems, smart area monitoring systems, systems for performing deep learning operations, systems for performing simulation operations, systems for performing digital twin operations, systems implemented using an edge device, systems incorporating one or more virtual machines (VMs), systems for performing synthetic data generation operations, systems implemented at least partially in a data center, systems for performing conversational AI operations, systems for performing light transport simulation, systems for performing collaborative content creation for 3D assets, systems for performing generative AI operations, systems implemented at least partially using cloud computing resources, and/or other types of systems.

Inference and Training Logic

Figure 7A:
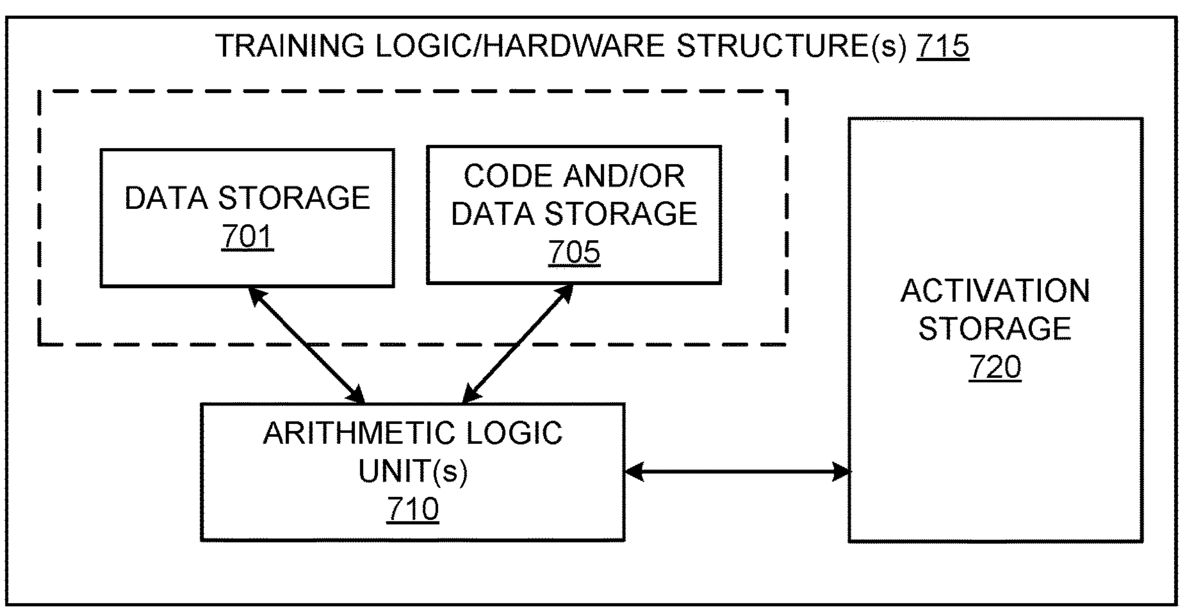
FIG. 7A illustrates inference and/or training logic, according to at least one embodiment.

FIG. 7A illustrates inference and/or training logic 715 used to perform inferencing and/or training operations associated with one or more embodiments.

In at least one embodiment, inference and/or training logic 715 may include, without limitation, code and/or data storage 701 to store forward and/or output weight and/or input/output data, and/or other parameters to configure neurons or layers of a neural network trained and/or used for inferencing in aspects of one or more embodiments. In at least one embodiment, training logic 715 may include, or be coupled to code and/or data storage 701 to store graph code or other software to control timing and/or order, in which weight and/or other parameter information is to be loaded to configure, logic, including integer and/or floating-point units (collectively, arithmetic logic units (ALUs) or simply circuits). In at least one embodiment, code, such as graph code, loads weight or other parameter information into processor ALUs based on an architecture of a neural network to which such code corresponds. In at least one embodiment, code and/or data storage 701 stores weight parameters and/or input/output data of each layer of a neural network trained or used in conjunction with one or more embodiments during forward propagation of input/output data and/or weight parameters during training and/or inferencing using aspects of one or more embodiments. In at least one embodiment, any portion of code and/or data storage 701 may be included with other on-chip or off-chip data storage, including a processor's L1, L2, or L3 cache or system memory.

In at least one embodiment, any portion of code and/or data storage 701 may be internal or external to one or more processors or other hardware logic devices or circuits. In at least one embodiment, code and/or code and/or data storage 701 may be cache memory, dynamic randomly addressable memory ("DRAM"), static randomly addressable memory ("SRAM"), non-volatile memory (e.g., flash memory), or other storage. In at least one embodiment, a choice of whether code and/or code and/or data storage 701 is internal or external to a processor, for example, or comprising DRAM, SRAM, flash or some other storage type may depend on available storage on-chip versus off-chip, latency requirements of training and/or inferencing functions being performed, batch size of data used in inferencing and/or training of a neural network, or some combination of these factors.

In at least one embodiment, inference and/or training logic 715 may include, without limitation, a code and/or data storage 705 to store backward and/or output weight and/or input/output data corresponding to neurons or layers of a neural network trained and/or used for inferencing in aspects of one or more embodiments. In at least one embodiment, code and/or data storage 705 stores weight parameters and/or input/output data of each layer of a neural network trained or used in conjunction with one or more embodiments during backward propagation of input/output data and/or weight parameters during training and/or inferencing using aspects of one or more embodiments. In at least one embodiment, training logic 715 may include, or be coupled to code and/or data storage 705 to store graph code or other software to control timing and/or order, in which weight and/or other parameter information is to be loaded to configure, logic, including integer and/or floating point units (collectively, arithmetic logic units (ALUs).

In at least one embodiment, code, such as graph code, causes the loading of weight or other parameter information into processor ALUs based on an architecture of a neural network to which such code corresponds. In at least one embodiment, any portion of code and/or data storage 705 may be included with other on-chip or off-chip data storage, including a processor's L1, L2, or L3 cache or system memory. In at least one embodiment, any portion of code and/or data storage 705 may be internal or external to one or more processors or other hardware logic devices or circuits. In at least one embodiment, code and/or data storage 705 may be cache memory, DRAM, SRAM, non-volatile memory (e.g., flash memory), or other storage. In at least one embodiment, a choice of whether code and/or data storage 705 is internal or external to a processor, for example, or comprising DRAM, SRAM, flash memory or some other storage type may depend on available storage on-chip versus off-chip, latency requirements of training and/or inferencing functions being performed, batch size of data used in inferencing and/or training of a neural network, or some combination of these factors.

In at least one embodiment, code and/or data storage 701 and code and/or data storage 705 may be separate storage structures. In at least one embodiment, code and/or data storage 701 and code and/or data storage 705 may be a combined storage structure. In at least one embodiment, code and/or data storage 701 and code and/or data storage 705 may be partially combined and partially separate. In at least one embodiment, any portion of code and/or data storage 701 and code and/or data storage 705 may be included with other on-chip or off-chip data storage, including a processor's L1, L2, or L3 cache or system memory.

In at least one embodiment, inference and/or training logic 715 may include, without limitation, one or more arithmetic logic unit(s) ("ALU(s)") 710, including integer and/or floating point units, to perform logical and/or mathematical operations based, at least in part on, or indicated by, training and/or inference code (e.g., graph code), a result of which may produce activations (e.g., output values from layers or neurons within a neural network) stored in an activation storage 720 that are functions of input/output and/or weight parameter data stored in code and/or data storage 701 and/or code and/or data storage 705. In at least one embodiment, activations stored in activation storage 720 are generated according to linear algebraic and or matrix-based mathematics performed by ALU(s) 710 in response to performing instructions or other code, wherein weight values stored in code and/or data storage 705 and/or data storage 701 are used as operands along with other values, such as bias values, gradient information, momentum values, or other parameters or hyperparameters, any or all of which may be stored in code and/or data storage 705 or code and/or data storage 701 or another storage on or off-chip.

In at least one embodiment, ALU(s) 710 are included within one or more processors or other hardware logic devices or circuits, whereas in another embodiment, ALU(s) 710 may be external to a processor or other hardware logic device or circuit that uses them (e.g., a co-processor). In at least one embodiment, ALU(s) 710 may be included within a processor's execution units or otherwise within a bank of ALUs accessible by a processor's execution units either within same processor or distributed between different processors of different types (e.g., central processing units, graphics processing units, fixed function units, etc.). In at least one embodiment, code and/or data storage 701, code and/or data storage 705, and activation storage 720 may share a processor or other hardware logic device or circuit, whereas in another embodiment, they may be in different processors or other hardware logic devices or circuits, or some combination of same and different processors or other hardware logic devices or circuits. In at least one embodiment, any portion of activation storage 720 may be included with other on-chip or off-chip data storage, including a processor's L1, L2, or L3 cache or system memory. Furthermore, inferencing and/or training code may be stored with other code accessible to a processor or other hardware logic or circuit and fetched and/or processed using a processor's fetch, decode, scheduling, execution, retirement and/or other logical circuits.

In at least one embodiment, activation storage 720 may be cache memory, DRAM, SRAM, non-volatile memory (e.g., flash memory), or other storage. In at least one embodiment, activation storage 720 may be completely or partially within or external to one or more processors or other logical circuits. In at least one embodiment, a choice of whether activation storage 720 is internal or external to a processor, for example, or comprising DRAM, SRAM, flash memory or some other storage type may depend on available storage on-chip versus off-chip, latency requirements of training and/or inferencing functions being performed, batch size of data used in inferencing and/or training of a neural network, or some combination of these factors.

In at least one embodiment, inference and/or training logic 715 illustrated in FIG. 7A may be used in conjunction with an application-specific integrated circuit ("ASIC"), such as a TensorFlow® Processing Unit from Google, an inference processing unit (IPU) from Graphcore™, or a Nervana® (e.g., "Lake Crest") processor from Intel Corp. In at least one embodiment, inference and/or training logic 715 illustrated in FIG. 7A may be used in conjunction with central processing unit ("CPU") hardware, graphics processing unit ("GPU") hardware or other hardware, such as field programmable gate arrays ("FPGAs").

Figure 7B:
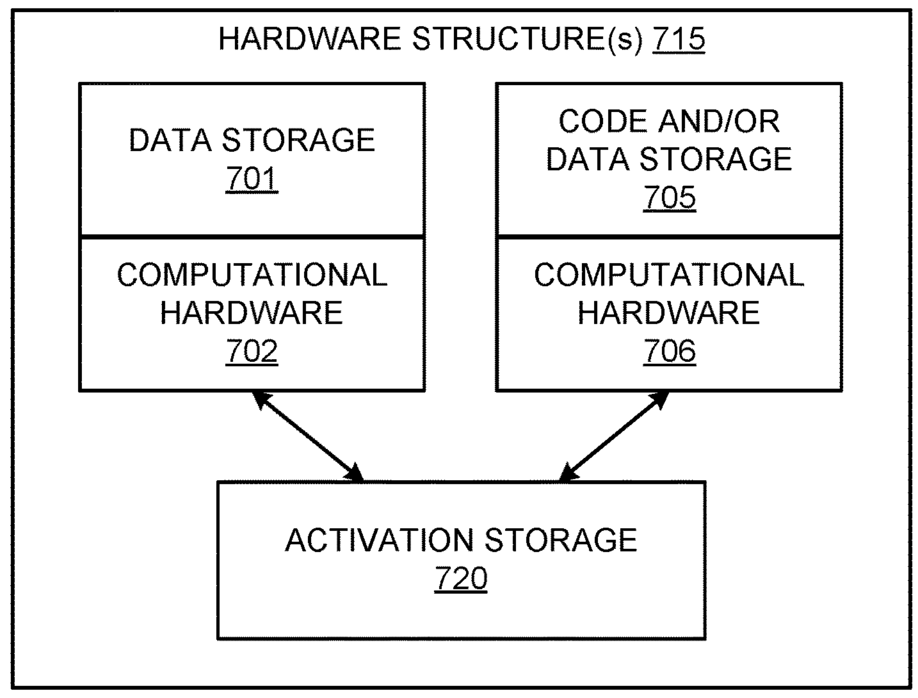
FIG. 7B illustrates inference and/or training logic, according to at least one embodiment.

FIG. 7B illustrates inference and/or training logic 715, according to at least one embodiment. In at least one embodiment, inference and/or training logic 715 may include, without limitation, hardware logic in which computational resources are dedicated or otherwise exclusively used in conjunction with weight values or other information corresponding to one or more layers of neurons within a neural network. In at least one embodiment, inference and/or training logic 715 illustrated in FIG. 7B may be used in conjunction with an application-specific integrated circuit (ASIC), such as TensorFlow® Processing Unit from Google, an inference processing unit (IPU) from Graphcore™, or a Nervana® (e.g., "Lake Crest") processor from Intel Corp. In at least one embodiment, inference and/or training logic 715 illustrated in FIG. 7B may be used in conjunction with central processing unit (CPU) hardware, graphics processing unit (GPU) hardware or other hardware, such as field programmable gate arrays (FPGAs). In at least one embodiment, inference and/or training logic 715 includes, without limitation, code and/or data storage 701 and code and/or data storage 705, which may be used to store code (e.g., graph code), weight values and/or other information, including bias values, gradient information, momentum values, and/or other parameter or hyperparameter information. In at least one embodiment illustrated in FIG. 7B, each of code and/or data storage 701 and code and/or data storage 705 is associated with a dedicated computational resource, such as computational hardware 702 and computational hardware 706, respectively. In at least one embodiment, each of computational hardware 702 and computational hardware 706 comprises one or more ALUs that perform mathematical functions, such as linear algebraic functions, only on information stored in code and/or data storage 701 and code and/or data storage 705, respectively, result of which is stored in activation storage 720.

In at least one embodiment, each of code and/or data storage 701 and 705 and corresponding computational hardware 702 and 706, respectively, correspond to different layers of a neural network, such that resulting activation from one storage/computational pair 701/702 of code and/or data storage 701 and computational hardware 702 is provided as an input to a next storage/computational pair 705/706 of code and/or data storage 705 and computational hardware 706, in order to mirror a conceptual organization of a neural network. In at least one embodiment, each of storage/computational pairs 701/702 and 705/706 may correspond to more than one neural network layer. In at least one embodiment, additional storage/computation pairs (not shown) subsequent to or in parallel with storage/computation pairs 701/702 and 705/706 may be included in inference and/or training logic 715.

Neural Network Training and Deployment

Figure 8:
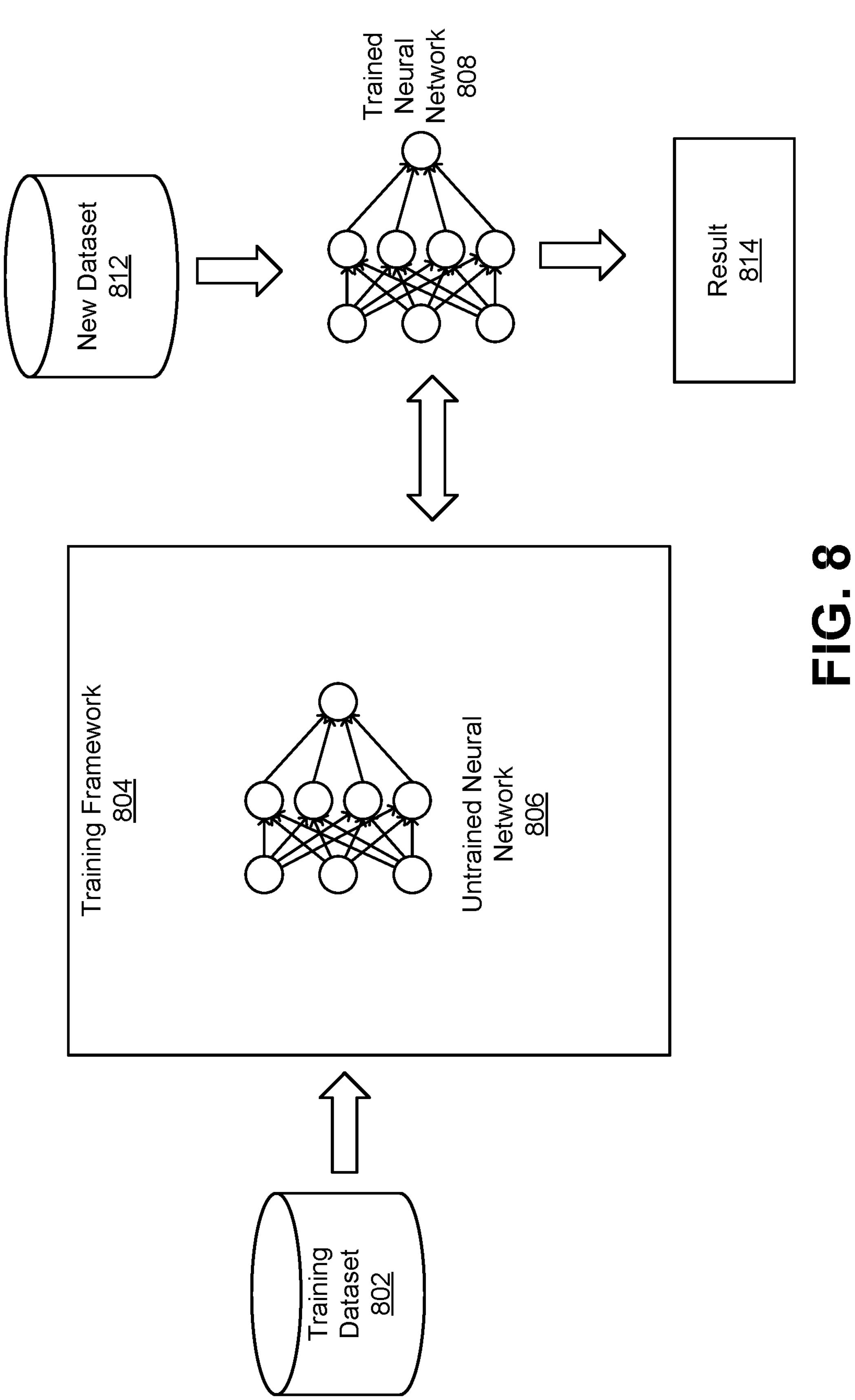
FIG. 8 illustrates training and deployment of a neural network, according to at least one embodiment.

FIG. 8 illustrates training and deployment of a deep neural network, according to at least one embodiment. In at least one embodiment, untrained neural network 806 is trained using a training dataset 802. In at least one embodiment, training framework 804 is a PyTorch framework, whereas in other embodiments, training framework 804 is a TensorFlow, Boost, Caffe, Microsoft Cognitive Toolkit/CNTK, MXNet, Chainer, Keras, Deeplearning4j, or other training framework. In at least one embodiment, training framework 804 trains an untrained neural network 806 and enables it to be trained using processing resources described herein to generate a trained neural network 808. In at least one embodiment, weights may be chosen randomly or by pre-training using a deep belief network. In at least one embodiment, training may be performed in either a supervised, partially supervised, or unsupervised manner.

In at least one embodiment, untrained neural network 806 is trained using supervised learning, wherein training dataset 802 includes an input paired with a desired output for an input, or where training dataset 802 includes input having a known output and an output of neural network 806 is manually graded. In at least one embodiment, untrained neural network 806 is trained in a supervised manner and processes inputs from training dataset 802 and compares resulting outputs against a set of expected or desired outputs. In at least one embodiment, errors are then propagated back through untrained neural network 806. In at least one embodiment, training framework 804 adjusts weights that control untrained neural network 806. In at least one embodiment, training framework 804 includes tools to monitor how well untrained neural network 806 is converging towards a model, such as trained neural network 808, suitable to generating correct answers, such as in result 814, based on input data such as a new dataset 812. In at least one embodiment, training framework 804 trains untrained neural network 806 repeatedly while adjusting weights to refine an output of untrained neural network 806 using a loss function and adjustment algorithm, such as stochastic gradient descent. In at least one embodiment, training framework 804 trains untrained neural network 806 until untrained neural network 806 achieves a desired accuracy. In at least one embodiment, trained neural network 808 can then be deployed to implement any number of machine learning operations.

In at least one embodiment, untrained neural network 806 is trained using unsupervised learning, whereas untrained neural network 806 attempts to train itself using unlabeled data. In at least one embodiment, unsupervised learning training dataset 802 will include input data without any associated output data or "ground truth" data. In at least one embodiment, untrained neural network 806 can learn groupings within training dataset 802 and can determine how individual inputs are related to untrained dataset 802. In at least one embodiment, unsupervised training can be used to generate a self-organizing map in trained neural network 808 capable of performing operations useful in reducing dimensionality of new dataset 812. In at least one embodiment, unsupervised training can also be used to perform anomaly detection, which allows identification of data points in new dataset 812 that deviate from normal patterns of new dataset 812.

In at least one embodiment, semi-supervised learning may be used, which is a technique in which in training dataset 802 includes a mix of labeled and unlabeled data. In at least one embodiment, training framework 804 may be used to perform incremental learning, such as through transferred learning techniques. In at least one embodiment, incremental learning enables trained neural network 808 to adapt to new dataset 812 without forgetting knowledge instilled within trained neural network 808 during initial training.

Figure 9:
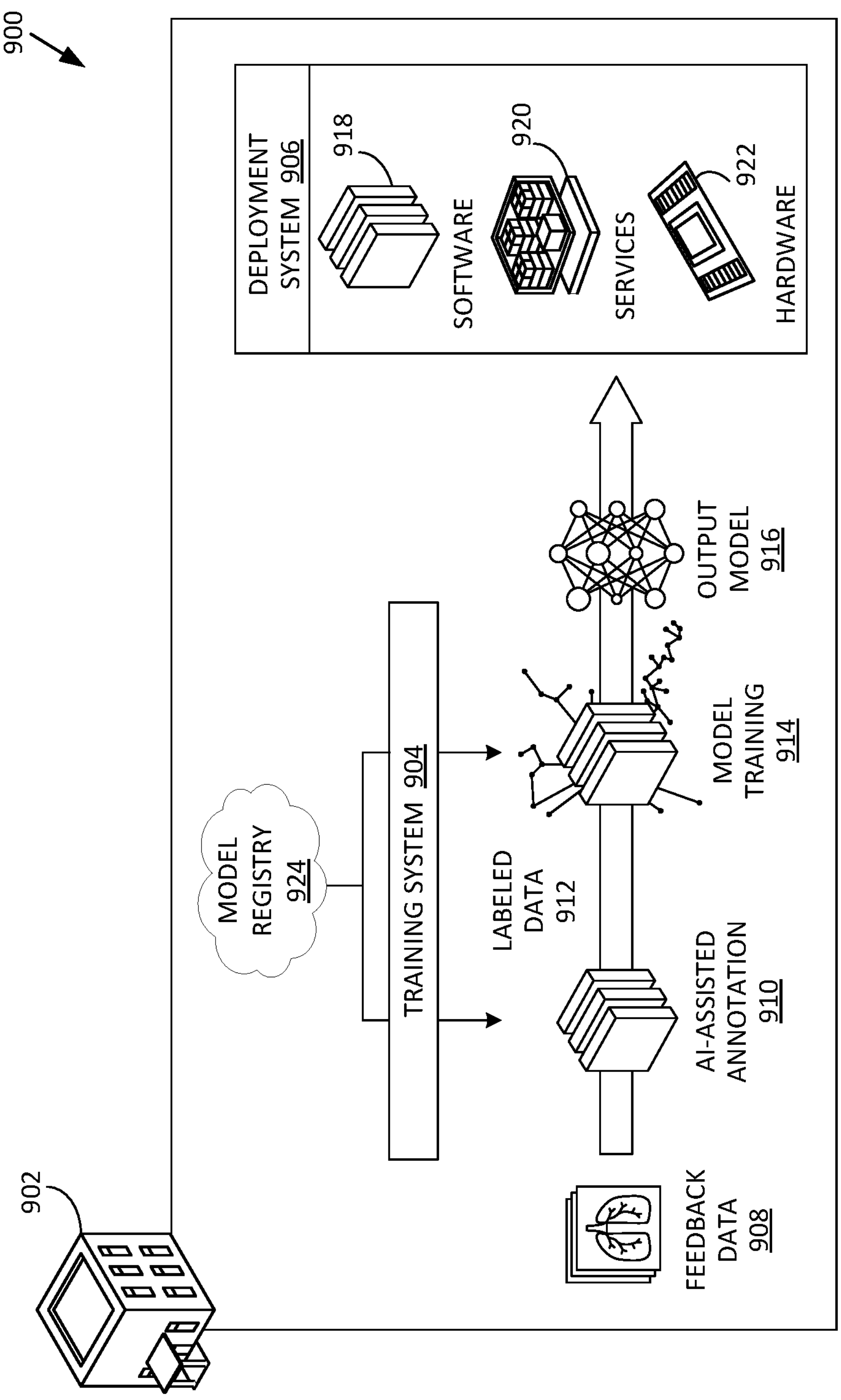
FIG. 9 is an example data flow diagram for an advanced computing pipeline, according to at least one embodiment.

With reference to FIG. 9, FIG. 9 is an example data flow diagram for a process 900 of generating and deploying a processing and inferencing pipeline, according to at least one embodiment. In at least one embodiment, process 900 may be deployed to perform game name recognition analysis and inferencing on user feedback data at one or more facilities 902, such as a data center.

In at least one embodiment, process 900 may be executed within a training system 904 and/or a deployment system 906. In at least one embodiment, training system 904 may be used to perform training, deployment, and embodiment of machine learning models (e.g., neural networks, object detection algorithms, computer vision algorithms, etc.) for use in deployment system 906. In at least one embodiment, deployment system 906 may be configured to offload processing and compute resources among a distributed computing environment to reduce infrastructure requirements at facility 902. In at least one embodiment, deployment system 906 may provide a streamlined platform for selecting, customizing, and implementing virtual instruments for use with computing devices at facility 902. In at least one embodiment, virtual instruments may include software-defined applications for performing one or more processing operations with respect to feedback data. In at least one embodiment, one or more applications in a pipeline may use or call upon services (e.g., inference, visualization, compute, AI, etc.) of deployment system 906 during execution of applications.

In at least one embodiment, some applications used in advanced processing and inferencing pipelines may use machine learning models or other AI to perform one or more processing steps. In at least one embodiment, machine learning models may be trained at facility 902 using feedback data 908 (such as imaging data) stored at facility 902 or feedback data 908 from another facility or facilities, or a combination thereof. In at least one embodiment, training system 904 may be used to provide applications, services, and/or other resources for generating working, deployable machine learning models for deployment system 906.

In at least one embodiment, a model registry 924 may be backed by object storage that may support versioning and object metadata. In at least one embodiment, object storage may be accessible through, for example, a cloud storage (e.g., a cloud 1026 of FIG. 10) compatible application programming interface (API) from within a cloud platform. In at least one embodiment, machine learning models within model registry 924 may be uploaded, listed, modified, or deleted by developers or partners of a system interacting with an API. In at least one embodiment, an API may provide access to methods that allow users with appropriate credentials to associate models with applications, such that models may be executed as part of execution of containerized instantiations of applications.

In at least one embodiment, a training pipeline 1004 (FIG. 10) may include a scenario where facility 902 is training their own machine learning model, or has an existing machine learning model that needs to be optimized or updated. In at least one embodiment, feedback data 908 may be received from various channels, such as forums, web forms, or the like. In at least one embodiment, once feedback data 908 is received, AI-assisted annotation 910 may be used to aid in generating annotations corresponding to feedback data 908 to be used as ground truth data for a machine learning model. In at least one embodiment, AI-assisted annotation 910 may include one or more machine learning models (e.g., convolutional neural networks (CNNs)) that may be trained to generate annotations corresponding to certain types of feedback data 908 (e.g., from certain devices) and/or certain types of anomalies in feedback data 908. In at least one embodiment, AI-assisted annotations 910 may then be used directly, or may be adjusted or fine-tuned using an annotation tool, to generate ground truth data. In at least one embodiment, in some examples, labeled data 912 may be used as ground truth data for training a machine learning model. In at least one embodiment, AI-assisted annotations 910, labeled data 912, or a combination thereof may be used as ground truth data for training a machine learning model, e.g., via model training 914 in FIGS. 9-10. In at least one embodiment, a trained machine learning model may be referred to as an output model 916, and may be used by deployment system 906, as described herein.

In at least one embodiment, training pipeline 1004 (FIG. 10) may include a scenario where facility 902 needs a machine learning model for use in performing one or more processing tasks for one or more applications in deployment system 906, but facility 902 may not currently have such a machine learning model (or may not have a model that is optimized, efficient, or effective for such purposes). In at least one embodiment, an existing machine learning model may be selected from model registry 924. In at least one embodiment, model registry 924 may include machine learning models trained to perform a variety of different inference tasks on imaging data. In at least one embodiment, machine learning models in model registry 924 may have been trained on imaging data from different facilities than facility 902 (e.g., facilities that are remotely located). In at least one embodiment, machine learning models may have been trained on imaging data from one location, two locations, or any number of locations. In at least one embodiment, when being trained on imaging data, which may be a form of feedback data 908, from a specific location, training may take place at that location, or at least in a manner that protects confidentiality of imaging data or restricts imaging data from being transferred off-premises (e.g., to comply with HIPAA regulations, privacy regulations, etc.). In at least one embodiment, once a model is trained—or partially trained—at one location, a machine learning model may be added to model registry 924. In at least one embodiment, a machine learning model may then be retrained, or updated, at any number of other facilities, and a retrained or updated model may be made available in model registry 924. In at least one embodiment, a machine learning model may then be selected from model registry 924—and referred to as output model 916—and may be used in deployment system 906 to perform one or more processing tasks for one or more applications of a deployment system.

In at least one embodiment, training pipeline 1004 (FIG. 10) may be used in a scenario that includes facility 902 requiring a machine learning model for use in performing one or more processing tasks for one or more applications in deployment system 906, but facility 902 may not currently have such a machine learning model (or may not have a model that is optimized, efficient, or effective for such purposes). In at least one embodiment, a machine learning model selected from model registry 924 might not be fine-tuned or optimized for feedback data 908 generated at facility 902 because of differences in populations, genetic variations, robustness of training data used to train a machine learning model, diversity in anomalies of training data, and/or other issues with training data. In at least one embodiment, AI-assisted annotation 910 may be used to aid in generating annotations corresponding to feedback data 908 to be used as ground truth data for retraining or updating a machine learning model. In at least one embodiment, labeled data 912 may be used as ground truth data for training a machine learning model. In at least one embodiment, retraining or updating a machine learning model may be referred to as model training 914. In at least one embodiment, model training 914—e.g., AI-assisted annotations 910, labeled data 912, or a combination thereof—may be used as ground truth data for retraining or updating a machine learning model.

In at least one embodiment, deployment system 906 may include software 918, services 920, hardware 922, and/or other components, features, and functionality. In at least one embodiment, deployment system 906 may include a software "stack," such that software 918 may be built on top of services 920 and may use services 920 to perform some or all of processing tasks, and services 920 and software 918 may be built on top of hardware 922 and use hardware 922 to execute processing, storage, and/or other compute tasks of deployment system 906.

In at least one embodiment, software 918 may include any number of different containers, where each container may execute an instantiation of an application. In at least one embodiment, each application may perform one or more processing tasks in an advanced processing and inferencing pipeline (e.g., inferencing, object detection, feature detection, segmentation, image enhancement, calibration, etc.). In at least one embodiment, for each type of computing device there may be any number of containers that may perform a data processing task with respect to feedback data 908 (or other data types, such as those described herein). In at least one embodiment, an advanced processing and inferencing pipeline may be defined based on selections of different containers that are desired or required for processing feedback data 908, in addition to containers that receive and configure imaging data for use by each container and/or for use by facility 902 after processing through a pipeline (e.g., to convert outputs back to a usable data type for storage and display at facility 902). In at least one embodiment, a combination of containers within software 918 (e.g., that make up a pipeline) may be referred to as a virtual instrument (as described in more detail herein), and a virtual instrument may leverage services 920 and hardware 922 to execute some or all processing tasks of applications instantiated in containers.

In at least one embodiment, data may undergo pre-processing as part of data processing pipeline to prepare data for processing by one or more applications. In at least one embodiment, post-processing may be performed on an output of one or more inferencing tasks or other processing tasks of a pipeline to prepare an output data for a next application and/or to prepare output data for transmission and/or use by a user (e.g., as a response to an inference request). In at least one embodiment, inferencing tasks may be performed by one or more machine learning models, such as trained or deployed neural networks, which may include output models 916 of training system 904.

In at least one embodiment, tasks of data processing pipeline may be encapsulated in one or more container(s) that each represent a discrete, fully functional instantiation of an application and virtualized computing environment that is able to reference machine learning models. In at least one embodiment, containers or applications may be published into a private (e.g., limited access) area of a container registry (described in more detail herein), and trained or deployed models may be stored in model registry 924 and associated with one or more applications. In at least one embodiment, images of applications (e.g., container images) may be available in a container registry, and once selected by a user from a container registry for deployment in a pipeline, an image may be used to generate a container for an instantiation of an application for use by a user system.

In at least one embodiment, developers may develop, publish, and store applications (e.g., as containers) for performing processing and/or inferencing on supplied data. In at least one embodiment, development, publishing, and/or storing may be performed using a software development kit (SDK) associated with a system (e.g., to ensure that an application and/or container developed is compliant with or compatible with a system). In at least one embodiment, an application that is developed may be tested locally (e.g., at a first facility, on data from a first facility) with an SDK which may support at least some of services 920 as a system (e.g., architecture 1000 of FIG. 10). In at least one embodiment, once validated by architecture 1000 (e.g., for accuracy, etc.), an application may be available in a container registry for selection and/or embodiment by a user (e.g., a hospital, clinic, lab, healthcare provider, etc.) to perform one or more processing tasks with respect to data at a facility (e.g., a second facility) of a user.

Figure 10:
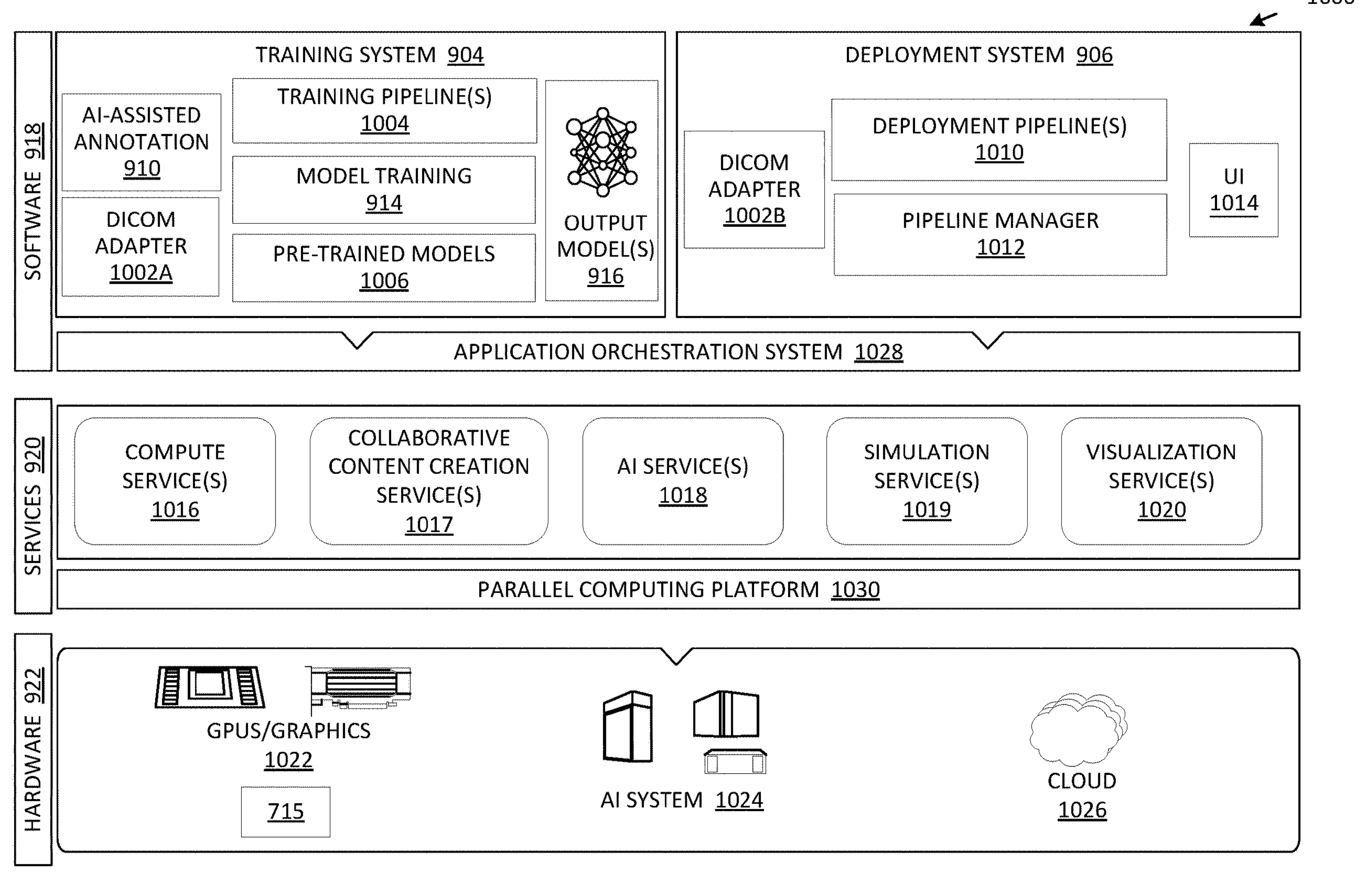
FIG. 10 is a system diagram for an example system for training, adapting, instantiating and deploying machine learning models in an advanced computing pipeline, according to at least one embodiment.

In at least one embodiment, developers may then share applications or containers through a network for access and use by users of a system (e.g., architecture 1000 of FIG. 10). In at least one embodiment, completed and validated applications or containers may be stored in a container registry and associated machine learning models may be stored in model registry 924. In at least one embodiment, a requesting entity that provides an inference or image processing request may browse a container registry and/or model registry 924 for an application, container, dataset, machine learning model, etc., select a desired combination of elements for inclusion in data processing pipeline, and submit a processing request. In at least one embodiment, a request may include input data that is necessary to perform a request, and/or may include a selection of application(s) and/or machine learning models to be executed in processing a request. In at least one embodiment, a request may then be passed to one or more components of deployment system 906 (e.g., a cloud) to perform processing of a data processing pipeline. In at least one embodiment, processing by deployment system 906 may include referencing selected elements (e.g., applications, containers, models, etc.) from a container registry and/or model registry 924. In at least one embodiment, once results are generated by a pipeline, results may be returned to a user for reference (e.g., for viewing in a viewing application suite executing on a local, on-premises workstation or terminal).

In at least one embodiment, to aid in processing or execution of applications or containers in pipelines, services 920 may be leveraged. In at least one embodiment, services 920 may include compute services, collaborative content creation services, simulation services, artificial intelligence (AI) services, visualization services, and/or other service types. In at least one embodiment, services 920 may provide functionality that is common to one or more applications in software 918, so functionality may be abstracted to a service that may be called upon or leveraged by applications. In at least one embodiment, functionality provided by services 920 may run dynamically and more efficiently, while also scaling well by allowing applications to process data in parallel, e.g., using a parallel computing platform 1030 (FIG. 10). In at least one embodiment, rather than each application that shares a same functionality offered by a service 920 being required to have a respective instance of service 920, service 920 may be shared between and among various applications. In at least one embodiment, services may include an inference server or engine that may be used for executing detection or segmentation tasks, as non-limiting examples. In at least one embodiment, a model training service may be included that may provide machine learning model training and/or retraining capabilities.

In at least one embodiment, where a service 920 includes an AI service (e.g., an inference service), one or more machine learning models associated with an application for anomaly detection (e.g., tumors, growth abnormalities, scarring, etc.) may be executed by calling upon (e.g., as an API call) an inference service (e.g., an inference server) to execute machine learning model(s), or processing thereof, as part of application execution. In at least one embodiment, where another application includes one or more machine learning models for segmentation tasks, an application may call upon an inference service to execute machine learning models for performing one or more of processing operations associated with segmentation tasks. In at least one embodiment, software 918 implementing advanced processing and inferencing pipeline may be streamlined because each application may call upon the same inference service to perform one or more inferencing tasks.

In at least one embodiment, hardware 922 may include GPUs, CPUs, graphics cards, an AI/deep learning system (e.g., an AI supercomputer, such as NVIDIA's DGX™ supercomputer system), a cloud platform, or a combination thereof. In at least one embodiment, different types of hardware 922 may be used to provide efficient, purpose-built support for software 918 and services 920 in deployment system 906. In at least one embodiment, use of GPU processing may be implemented for processing locally (e.g., at facility 902), within an AI/deep learning system, in a cloud system, and/or in other processing components of deployment system 906 to improve efficiency, accuracy, and efficacy of game name recognition.

In at least one embodiment, software 918 and/or services 920 may be optimized for GPU processing with respect to deep learning, machine learning, and/or high-performance computing, simulation, and visual computing, as non-limiting examples. In at least one embodiment, at least some of the computing environment of deployment system 906 and/or training system 904 may be executed in a datacenter or one or more supercomputers or high performance computing systems, with GPU-optimized software (e.g., hardware and software combination of NVIDIA's DGX™ system). In at least one embodiment, hardware 922 may include any number of GPUs that may be called upon to perform processing of data in parallel, as described herein. In at least one embodiment, cloud platform may further include GPU processing for GPU-optimized execution of deep learning tasks, machine learning tasks, or other computing tasks. In at least one embodiment, cloud platform (e.g., NVIDIA's NGC™) may be executed using an AI/deep learning supercomputer(s) and/or GPU-optimized software (e.g., as provided on NVIDIA's DGX™ systems) as a hardware abstraction and scaling platform. In at least one embodiment, cloud platform may integrate an application container clustering system or orchestration system (e.g., KUBERNETES) on multiple GPUs to enable seamless scaling and load balancing.

FIG. 10 is a system diagram for an example architecture 1000 for generating and deploying a deployment pipeline, according to at least one embodiment. In at least one embodiment, architecture 1000 may be used to implement process 900 of FIG. 9 and/or other processes including advanced processing and inferencing pipelines. In at least one embodiment, architecture 1000 may include training system 904 and deployment system 906. In at least one embodiment, training system 904 and deployment system 906 may be implemented using software 918, services 920, and/or hardware 922, as described herein.

In at least one embodiment, architecture 1000 (e.g., training system 904 and/or deployment system 906) may implemented in a cloud computing environment (e.g., using cloud 1026). In at least one embodiment, architecture 1000 may be implemented locally with respect to a facility, or as a combination of both cloud and local computing resources. In at least one embodiment, access to APIs in cloud 1026 may be restricted to authorized users through enacted security measures or protocols. In at least one embodiment, a security protocol may include web tokens that may be signed by an authentication (e.g., AuthN, AuthZ, Gluecon, etc.) service and may carry appropriate authorization. In at least one embodiment, APIs of virtual instruments (described herein), or other instantiations of architecture 1000, may be restricted to a set of public internet service providers (ISPs) that have been vetted or authorized for interaction.

In at least one embodiment, various components of architecture 1000 may communicate between and among one another using any of a variety of different network types, including but not limited to local area networks (LANs) and/or wide area networks (WANs) via wired and/or wireless communication protocols. In at least one embodiment, communication between facilities and components of architecture 1000 (e.g., for transmitting inference requests, for receiving results of inference requests, etc.) may be communicated over a data bus or data busses, wireless data protocols (Wi-Fi), wired data protocols (e.g., Ethernet), etc.

In at least one embodiment, training system 904 may execute training pipelines 1004, similar to those described herein with respect to FIG. 9. In at least one embodiment, where one or more machine learning models are to be used in deployment pipelines 1010 by deployment system 906, training pipelines 1004 may be used to train or retrain one or more (e.g., pre-trained) models, and/or implement one or more of pre-trained models 1006 (e.g., without a need for retraining or updating). In at least one embodiment, as a result of training pipelines 1004, output model(s) 916 may be generated. In at least one embodiment, training pipelines 1004 may include any number of processing steps, AI-assisted annotation 910, labeling or annotating of feedback data 908 to generate labeled data 912, model selection from a model registry, model training 914, training, retraining, or updating models, and/or other processing steps. In at least one embodiment, for different machine learning models used by deployment system 906, different training pipelines 1004 may be used. In at least one embodiment, training pipeline 1004, similar to a first example described with respect to FIG. 9, may be used for a first machine learning model, training pipeline 1004, similar to a second example described with respect to FIG. 9, may be used for a second machine learning model, and training pipeline 1004, similar to a third example described with respect to FIG. 9, may be used for a third machine learning model. In at least one embodiment, any combination of tasks within training system 904 may be used depending on what is required for each respective machine learning model. In at least one embodiment, one or more of machine learning models may already be trained and ready for deployment so machine learning models may not undergo any processing by training system 904, and may be implemented by deployment system 906.

In at least one embodiment, output model(s) 916 and/or pre-trained model(s) 1006 may include any types of machine learning models depending on embodiment. In at least one embodiment, and without limitation, machine learning models used by architecture 1000 may include machine learning model(s) using linear regression, logistic regression, decision trees, support vector machines (SVM), Naïve Bayes, k-nearest neighbor (Knn), K means clustering, random forest, dimensionality reduction algorithms, gradient boosting algorithms, neural networks (e.g., auto-encoders, convolutional, recurrent, perceptrons, Long/Short Term Memory (LSTM), Bi-LSTM, Hopfield, Boltzmann, deep belief, deconvolutional, generative adversarial, liquid state machine, etc.), and/or other types of machine learning models.

In at least one embodiment, training pipelines 1004 may include AI-assisted annotation. In at least one embodiment, labeled data 912 (e.g., traditional annotation) may be generated by any number of techniques. In at least one embodiment, labels or other annotations may be generated within a drawing program (e.g., an annotation program), a computer aided design (CAD) program, a labeling program, another type of program suitable for generating annotations or labels for ground truth, and/or may be hand drawn, in some examples. In at least one embodiment, ground truth data may be synthetically produced (e.g., generated from computer models or renderings), real produced (e.g., designed and produced from real-world data), machine-automated (e.g., using feature analysis and learning to extract features from data and then generate labels), human annotated (e.g., labeler, or annotation expert, defines location of labels), and/or a combination thereof. In at least one embodiment, for each instance of feedback data 908 (or other data type used by machine learning models), there may be corresponding ground truth data generated by training system 904. In at least one embodiment, AI-assisted annotation may be performed as part of deployment pipelines 1010; either in addition to, or in lieu of, AI-assisted annotation included in training pipelines 1004. In at least one embodiment, architecture 1000 may include a multi-layer platform that may include a software layer (e.g., software 918) of diagnostic applications (or other application types) that may perform one or more medical imaging and diagnostic functions.

In at least one embodiment, a software layer may be implemented as a secure, encrypted, and/or authenticated API through which applications or containers may be invoked (e.g., called) from an external environment(s), e.g., facility 902. In at least one embodiment, applications may then call or execute one or more services 920 for performing compute, AI, or visualization tasks associated with respective applications, and software 918 and/or services 920 may leverage hardware 922 to perform processing tasks in an effective and efficient manner.

In at least one embodiment, deployment system 906 may execute deployment pipelines 1010. In at least one embodiment, deployment pipelines 1010 may include any number of applications that may be sequentially, non-sequentially, or otherwise applied to feedback data (and/or other data types), including AI-assisted annotation, as described above. In at least one embodiment, as described herein, a deployment pipeline 1010 for an individual device may be referred to as a virtual instrument for a device. In at least one embodiment, for a single device, there may be more than one deployment pipeline 1010 depending on information desired from data generated by a device.

In at least one embodiment, applications available for deployment pipelines 1010 may include any application that may be used for performing processing tasks on feedback data or other data from devices. In at least one embodiment, because various applications may share common image operations, in some embodiments, a data augmentation library (e.g., as one of services 920) may be used to accelerate these operations. In at least one embodiment, to avoid bottlenecks of conventional processing approaches that rely on CPU processing, parallel computing platform 1030 may be used for GPU acceleration of these processing tasks.

In at least one embodiment, deployment system 906 may include a user interface (UI) 1014 (e.g., a graphical user interface, a web interface, etc.) that may be used to select applications for inclusion in deployment pipeline(s) 1010, arrange applications, modify or change applications or parameters or constructs thereof, use and intera with deployment pipeline(s) 1010 during set-up and/or deployment, and/or to otherwise interact with deployment system 906. In at least one embodiment, although not illustrated with respect to training system 904, UI 1014 (or a different user interface) may be used for selecting models for use in deployment system 906, for selecting models for training, or retraining, in training system 904, and/or for otherwise interacting with training system 904. In at least one embodiment, training system 904 and deployment system 906 may include DICOM adapters 1002A and 1002B.

In at least one embodiment, pipeline manager 1012 may be used, in addition to an application orchestration system 1028, to manage interaction between applications or containers of deployment pipeline(s) 1010 and services 920 and/or hardware 922. In at least one embodiment, pipeline manager 1012 may be configured to facilitate interactions from application to application, from application to service 920, and/or from application or service to hardware 922. In at least one embodiment, although illustrated as included in software 918, this is not intended to be limiting, and in some examples pipeline manager 1012 may be included in services 920. In at least one embodiment, application orchestration system 1028 (e.g., Kubernetes, DOCKER, etc.) may include a container orchestration system that may group applications into containers as logical units for coordination, management, scaling, and deployment. In at least one embodiment, by associating applications from deployment pipeline(s) 1010 (e.g., a reconstruction application, a segmentation application, etc.) with individual containers, each application may execute in a self-contained environment (e.g., at a kernel level) to increase speed and efficiency.

In at least one embodiment, each application and/or container (or image thereof) may be individually developed, modified, and deployed (e.g., a first user or developer may develop, modify, and deploy a first application and a second user or developer may develop, modify, and deploy a second application separate from a first user or developer), which may allow for focus on, and attention to, a task of a single application and/or container(s) without being hindered by tasks of other application(s) or container(s). In at least one embodiment, communication, and cooperation between different containers or applications may be aided by pipeline manager 1012 and application orchestration system 1028. In at least one embodiment, so long as an expected input and/or output of each container or application is known by a system (e.g., based on constructs of applications or containers), application orchestration system 1028 and/or pipeline manager 1012 may facilitate communication among and between, and sharing of resources among and between, each of applications or containers. In at least one embodiment, because one or more of applications or containers in deployment pipeline(s) 1010 may share the same services and resources, application orchestration system 1028 may orchestrate, load balance, and determine sharing of services or resources between and among various applications or containers. In at least one embodiment, a scheduler may be used to track resource requirements of applications or containers, current usage or planned usage of these resources, and resource availability. In at least one embodiment, the scheduler may thus allocate resources to different applications and distribute resources between and among applications in view of requirements and availability of a system. In some examples, the scheduler (and/or other component of application orchestration system 1028) may determine resource availability and distribution based on constraints imposed on a system (e.g., user constraints), such as quality of service (QoS), urgency of need for data outputs (e.g., to determine whether to execute real-time processing or delayed processing), etc.

In at least one embodiment, services 920 leveraged and shared by applications or containers in deployment system 906 may include compute services 1016, collaborative content creation services 1017, AI services 1018, simulation services 1019, visualization services 1020, and/or other service types. In at least one embodiment, applications may call (e.g., execute) one or more of services 920 to perform processing operations for an application. In at least one embodiment, compute services 1016 may be leveraged by applications to perform super-computing or other high-performance computing (HPC) tasks. In at least one embodiment, compute service(s) 1016 may be leveraged to perform parallel processing (e.g., using a parallel computing platform 1030) for processing data through one or more of applications and/or one or more tasks of a single application, substantially simultaneously. In at least one embodiment, parallel computing platform 1030 (e.g., NVIDIA's CUDA®) may enable general purpose computing on GPUs (GPGPU) (e.g., GPUs 1022). In at least one embodiment, a software layer of parallel computing platform 1030 may provide access to virtual instruction sets and parallel computational elements of GPUs, for execution of compute kernels. In at least one embodiment, parallel computing platform 1030 may include memory and, in some embodiments, a memory may be shared between and among multiple containers, and/or between and among different processing tasks within a single container. In at least one embodiment, inter-process communication (IPC) calls may be generated for multiple containers and/or for multiple processes within a container to use same data from a shared segment of memory of parallel computing platform 1030 (e.g., where multiple different stages of an application or multiple applications are processing same information). In at least one embodiment, rather than making a copy of data and moving data to different locations in memory (e.g., a read/write operation), same data in the same location of a memory may be used for any number of processing tasks (e.g., at the same time, at different times, etc.). In at least one embodiment, as data is used to generate new data as a result of processing, this information of a new location of data may be stored and shared between various applications. In at least one embodiment, location of data and a location of updated or modified data may be part of a definition of how a payload is understood within containers.

In at least one embodiment, AI services 1018 may be leveraged to perform inferencing services for executing machine learning model(s) associated with applications (e.g., tasked with performing one or more processing tasks of an application). In at least one embodiment, AI services 1018 may leverage AI system 1024 to execute machine learning model(s) (e.g., neural networks, such as CNNs) for segmentation, reconstruction, object detection, feature detection, classification, and/or other inferencing tasks. In at least one embodiment, applications of deployment pipeline(s) 1010 may use one or more of output models 916 from training system 904 and/or other models of applications to perform inference on imaging data (e.g., DICOM data, RIS data, CIS data, REST compliant data, RPC data, raw data, etc.). In at least one embodiment, two or more examples of inferencing using application orchestration system 1028 (e.g., a scheduler) may be available. In at least one embodiment, a first category may include a high priority/low latency path that may achieve higher service level agreements, such as for performing inference on urgent requests during an emergency, or for a radiologist during diagnosis. In at least one embodiment, a second category may include a standard priority path that may be used for requests that may be non-urgent or where analysis may be performed at a later time. In at least one embodiment, application orchestration system 1028 may distribute resources (e.g., services 920 and/or hardware 922) based on priority paths for different inferencing tasks of AI services 1018.

In at least one embodiment, shared storage may be mounted to AI services 1018 within architecture 1000. In at least one embodiment, shared storage may operate as a cache (or other storage device type) and may be used to process inference requests from applications. In at least one embodiment, when an inference request is submitted, a request may be received by a set of API instances of deployment system 906, and one or more instances may be selected (e.g., for best fit, for load balancing, etc.) to process a request. In at least one embodiment, to process a request, a request may be entered into a database, a machine learning model may be located from model registry 924 if not already in a cache, a validation step may ensure appropriate machine learning model is loaded into a cache (e.g., shared storage), and/or a copy of a model may be saved to a cache. In at least one embodiment, the scheduler (e.g., of pipeline manager 1012) may be used to launch an application that is referenced in a request if an application is not already running or if there are not enough instances of an application. In at least one embodiment, if an inference server is not already launched to execute a model, an inference server may be launched. In at least one embodiment, any number of inference servers may be launched per model. In at least one embodiment, in a pull model, in which inference servers are clustered, models may be cached whenever load balancing is advantageous. In at least one embodiment, inference servers may be statically loaded in corresponding, distributed servers.

In at least one embodiment, inferencing may be performed using an inference server that runs in a container. In at least one embodiment, an instance of an inference server may be associated with a model (and optionally a plurality of versions of a model). In at least one embodiment, if an instance of an inference server does not exist when a request to perform inference on a model is received, a new instance may be loaded. In at least one embodiment, when starting an inference server, a model may be passed to an inference server such that a same container may be used to serve different models so long as the inference server is running as a different instance.

In at least one embodiment, during application execution, an inference request for a given application may be received, and a container (e.g., hosting an instance of an inference server) may be loaded (if not already loaded), and a start procedure may be called. In at least one embodiment, pre-processing logic in a container may load, decode, and/or perform any additional pre-processing on incoming data (e.g., using a CPU(s) and/or GPU(s)). In at least one embodiment, once data is prepared for inference, a container may perform inference as necessary on data. In at least one embodiment, this may include a single inference call on one image (e.g., a hand X-ray), or may require inference on hundreds of images (e.g., a chest CT). In at least one embodiment, an application may summarize results before completing, which may include, without limitation, a single confidence score, pixel level-segmentation, voxel-level segmentation, generating a visualization, or generating text to summarize findings. In at least one embodiment, different models or applications may be assigned different priorities. For example, some models may have a real-time (turnaround time less than one minute) priority while others may have lower priority (e.g., turnaround less than 10 minutes). In at least one embodiment, model execution times may be measured from requesting institution or entity and may include partner network traversal time, as well as execution on an inference service.

In at least one embodiment, transfer of requests between services 920 and inference applications may be hidden behind a software development kit (SDK), and robust transport may be provided through a queue. In at least one embodiment, a request is placed in a queue via an API for an individual application/tenant ID combination and an SDK pulls a request from a queue and gives a request to an application. In at least one embodiment, a name of a queue may be provided in an environment from where an SDK picks up the request. In at least one embodiment, asynchronous communication through a queue may be useful as it may allow any instance of an application to pick up work as it becomes available. In at least one embodiment, results may be transferred back through a queue, to ensure no data is lost. In at least one embodiment, queues may also provide an ability to segment work, as highest priority work may go to a queue with most instances of an application connected to it, while lowest priority work may go to a queue with a single instance connected to it that processes tasks in an order received. In at least one embodiment, an application may run on a GPU-accelerated instance generated in cloud 1026, and an inference service may perform inferencing on a GPU.

In at least one embodiment, visualization services 1020 may be leveraged to generate visualizations for viewing outputs of applications and/or deployment pipeline(s) 1010. In at least one embodiment, GPUs 1022 may be leveraged by visualization services 1020 to generate visualizations. In at least one embodiment, rendering effects, such as ray-tracing or other light transport simulation techniques, may be implemented by visualization services 1020 to generate higher quality visualizations. In at least one embodiment, visualizations may include, without limitation, 2D image renderings, 3D volume renderings, 3D volume reconstruction, 2D tomographic slices, virtual reality displays, augmented reality displays, etc. In at least one embodiment, virtualized environments may be used to generate a virtual interactive display or environment (e.g., a virtual environment) for interaction by users of a system (e.g., doctors, nurses, radiologists, etc.). In at least one embodiment, visualization services 1020 may include an internal visualizer, cinematics, and/or other rendering or image processing capabilities or functionality (e.g., ray tracing, rasterization, internal optics, etc.).

In at least one embodiment, hardware 922 may include GPUs 1022, AI system 1024, cloud 1026, and/or any other hardware used for executing training system 904 and/or deployment system 906. In at least one embodiment, GPUs 1022 (e.g., NVIDIA's TESLA® and/or QUADRO® GPUs) may include any number of GPUs that may be used for executing processing tasks of compute services 1016, collaborative content creation services 1017, AI services 1018, simulation services 1019, visualization services 1020, other services, and/or any of features or functionality of software 918. For example, with respect to AI services 1018, GPUs 1022 may be used to perform pre-processing on imaging data (or other data types used by machine learning models), post-processing on outputs of machine learning models, and/or to perform inferencing (e.g., to execute machine learning models). In at least one embodiment, cloud 1026, AI system 1024, and/or other components of architecture 1000 may use GPUs 1022. In at least one embodiment, cloud 1026 may include a GPU-optimized platform for deep learning tasks. In at least one embodiment, AI system 1024 may use GPUs, and cloud 1026—or at least a portion tasked with deep learning or inferencing—may be executed using one or more AI systems 1024. As such, although hardware 922 is illustrated as discrete components, this is not intended to be limiting, and any components of hardware 922 may be combined with, or leveraged by, any other components of hardware 922.

In at least one embodiment, AI system 1024 may include a purpose-built computing system (e.g., a super-computer or an HPC) configured for inferencing, deep learning, machine learning, and/or other artificial intelligence tasks. In at least one embodiment, AI system 1024 (e.g., NVIDIA's DGX™) may include GPU-optimized software (e.g., a software stack) that may be executed using a plurality of GPUs 1022, in addition to CPUs, RAM, storage, and/or other components, features, or functionality. In at least one embodiment, one or more AI systems 1024 may be implemented in cloud 1026 (e.g., in a data center) for performing some or all of AI-based processing tasks of architecture 1000.

In at least one embodiment, cloud 1026 may include a GPU-accelerated infrastructure (e.g., NVIDIA's NGC™) that may provide a GPU-optimized platform for executing processing tasks of architecture 1000. In at least one embodiment, cloud 1026 may include an AI system(s) 1024 for performing one or more of AI-based tasks of architecture 1000 (e.g., as a hardware abstraction and scaling platform). In at least one embodiment, cloud 1026 may integrate with application orchestration system 1028 leveraging multiple GPUs to enable seamless scaling and load balancing between and among applications and services 920. In at least one embodiment, cloud 1026 may be tasked with executing at least some of services 920 of architecture 1000, including compute services 1016, AI services 1018, and/or visualization services 1020, as described herein. In at least one embodiment, cloud 1026 may perform small and large batch inference (e.g., executing NVIDIA's TensorRT™), provide an accelerated parallel computing API and platform 1030 (e.g., NVIDIA's CUDA®), execute application orchestration system 1028 (e.g., KUBERNETES), provide a graphics rendering API and platform (e.g., for ray-tracing, 2D graphics, 3D graphics, and/or other rendering techniques to produce higher quality cinematics), and/or may provide other functionality for architecture 1000.

In at least one embodiment, in an effort to preserve patient confidentiality (e.g., where patient data or records are to be used off-premises), cloud 1026 may include a registry, such as a deep learning container registry. In at least one embodiment, a registry may store containers for instantiations of applications that may perform pre-processing, post-processing, or other processing tasks on patient data. In at least one embodiment, cloud 1026 may receive data that includes patient data as well as sensor data in containers, perform requested processing for just sensor data in those containers, and then forward a resultant output and/or visualizations to appropriate parties and/or devices (e.g., on-premises medical devices used for visualization or diagnoses), all without having to extract, store, or otherwise access patient data. In at least one embodiment, confidentiality of patient data is preserved in compliance with HIPAA and/or other data regulations.

Other variations are within the spirit of present disclosure. Thus, while disclosed techniques are susceptible to various modifications and alternative constructions, certain illustrated embodiments thereof are shown in drawings and have been described above in detail. It should be understood, however, that there is no intention to limit disclosure to specific form or forms disclosed, but on contrary, intention is to cover all modifications, alternative constructions, and equivalents falling within spirit and scope of disclosure, as defined in appended claims.

Use of terms "a" and "an" and "the" and similar referents in context of describing disclosed embodiments (especially in context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. "Connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within range, unless otherwise indicated herein and each separate value is incorporated into specification as if it were individually recited herein. In at least one embodiment, use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but subset and corresponding set may be equal.

Conjunctive language, such as phrases of form "at least one of A, B, and C," or "at least one of A, B and C," unless specifically stated otherwise or otherwise clearly contradicted by context, is otherwise understood with context as used in general to present that an item, term, etc., may be either A or B or C, or any nonempty subset of set of A and B and C. For instance, in illustrative example of a set having three members, conjunctive phrases "at least one of A, B, and C" and "at least one of A, B and C" refer to any of following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, the term "plurality" indicates a state of being plural (e.g., "a plurality of items" indicates multiple items). In at least one embodiment, a number of items in a plurality is at least two, but can be more when so indicated either explicitly or by context. Further, unless stated otherwise or otherwise clear from context, the phrase "based on" means "based at least in part on" and not "based solely on."

Operations of processes described herein can be performed in any suitable order unless otherwise indicated herein or otherwise clearly contradicted by context. In at least one embodiment, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in the form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause computer system to perform operations described herein. In at least one embodiment, set of non-transitory computer-readable storage media comprises multiple non-transitory computer-readable storage media and one or more of individual non-transitory storage media of multiple non-transitory computer-readable storage media lack all of code while multiple non-transitory computer-readable storage media collectively store all of code. In at least one embodiment, executable instructions are executed such that different instructions are executed by different processors—for example, a non-transitory computer-readable storage medium store instructions and a main central processing unit ("CPU") executes some of instructions while a graphics processing unit ("GPU") executes other instructions. In at least one embodiment, different components of a computer system have separate processors and different processors execute different subsets of instructions.

Accordingly, in at least one embodiment, computer systems are configured to implement one or more services that singly or collectively perform operations of processes described herein and such computer systems are configured with applicable hardware and/or software that enable performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate embodiments of disclosure and does not pose a limitation on scope of disclosure unless otherwise claimed. No language in specification should be construed as indicating any non-claimed element as essential to practice of disclosure.

All references, including publications, patent applications, and patents, cited herein are hereby incorporated by reference to the same extent as if each reference were individually and specifically indicated to be incorporated by reference and were set forth in its entirety herein.

In description and claims, terms "coupled" and "connected," along with their derivatives, may be used. It should be understood that these terms may be not intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to action and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, the term "processor" may refer to any device or portion of a device that processes electronic data from registers and/or memory and transforms that electronic data into other electronic data that may be stored in registers and/or memory. As non-limiting examples, "processor" may be a CPU or a GPU. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. In at least one embodiment, terms "system" and "method" are used herein interchangeably insofar as a system may embody one or more methods and methods may be considered a system.

In the present document, references may be made to obtaining, acquiring, receiving, or inputting analog or digital data into a subsystem, computer system, or computer-implemented machine. In at least one embodiment, a process of obtaining, acquiring, receiving, or inputting analog and digital data can be accomplished in a variety of ways such as by receiving data as a parameter of a function call or a call to an application programming interface. In at least one embodiment, processes of obtaining, acquiring, receiving, or inputting analog or digital data can be accomplished by transferring data via a serial or parallel interface. In at least one embodiment, processes of obtaining, acquiring, receiving, or inputting analog or digital data can be accomplished by transferring data via a computer network from providing entity to acquiring entity. In at least one embodiment, references may also be made to providing, outputting, transmitting, sending, or presenting analog or digital data. In various examples, processes of providing, outputting, transmitting, sending, or presenting analog or digital data can be accomplished by transferring data as an input or output parameter of a function call, a parameter of an application programming interface or interprocess communication mechanism.

Although descriptions herein set forth example embodiments of described techniques, other architectures may be used to implement described functionality, and are intended to be within scope of this disclosure. Furthermore, although specific distributions of responsibilities may be defined above for purposes of description, various functions and responsibilities might be distributed and divided in different ways, depending on circumstances.

Furthermore, although subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

What is claimed is:

1. A method comprising:

sampling a plurality of video frames from a video segment;

processing, using a computer vision (CV) model, the plurality of video frames to obtain an output comprising one or more tracks for respective one or more objects pictured in the video segment, each track comprising:

an identification of a corresponding object of the one or more objects, and a location of the corresponding object in at least a subset of the plurality of video frames;

generating, using the output, a prompt for a language model (LM); and generating, using the LM, a commentary about an action performed by the one or more objects over a time interval associated with the plurality of video frames.

2. The method of claim 1, wherein the plurality of video frames are sampled from the video segment with a sampling rate set in view of a speed of the action, and wherein the output further comprises one or more of:

a description of a state of motion of the one or more objects pictured in the video segment, a description of action performed by the one or more objects pictured in the video segment, or a description of interaction between the one or more objects pictured in the video segment.

3. The method of claim 1, further comprising:

processing, using optical character recognition, the video segment to recognize one or more symbols pictured in the video segment, wherein the prompt for the LM is further generated using the one or more recognized symbols.

4. The method of claim 1, further comprising:

processing, using a speech recognition model, the video segment to recognize one or more speech utterances in the video segment, wherein the prompt for the LM is further generated using the one or more recognized speech utterances.

5. The method of claim 1, further comprising:

obtaining a representation of a type of activity captured in the video segment; and performing at least one of:

including the obtained representation to the prompt for the LM; or causing, prior to the processing of the prompt by the LM, the LM to process the obtained representation.

6. The method of claim 1, further comprising:

using the generated commentary to perform at least one of:

storing the generated commentary in a computer memory;

presenting the generated commentary on a user interface; or causing at least a portion of the generated commentary to be attributed to one or more characters associated with an activity represented by the video segment.

7. The method of claim 1, further comprising:

generating a mapping of the generated commentary to one or more timestamps of the video segment.

8. The method of claim 7, further comprising:

generating, using the generated mapping, a closed captioning for the video segment.

9. The method of claim 7, further comprising:

applying the generated commentary to a text-to-speech conversion model to obtain an audio file comprising a spoken commentary about the action performed by the one or more objects.

10. The method of claim 9, further comprising:

generating a facial animation corresponding to the spoken commentary.

11. The method of claim 1, wherein the video segment is associated with at least one of:

an athletic activity, a computer game, an artistic event, an activity captured by a home automation system, an activity captured by a security surveillance system, an activity associated with one or more vulnerable persons, or an activity associated with an automotive environment.

12. The method of claim 1, wherein the prompt for the LM comprises an indication of a length limit for the commentary.

13. The method of claim 1, wherein the prompt for the LM comprises one or more previous instances of the commentary generated for a type of activity pictured in the video segment.

14. A system comprising:

one or more processing units to:

sample a plurality of video frames from a video segment;

process, using a computer vision (CV) model, the plurality of video frames to obtain an output comprising:

one or more tracks for respective one or more objects pictured in the video segment, each track comprising (i) an identification of a corresponding object of the one or more objects and (ii) a location of the corresponding object in at least a subset of the plurality of video frames, and one or more of:

a description of a state of motion of the one or more objects, a description of action performed by the one or more objects, or a description of interaction between the one or more objects;

generate, using the obtained output, a prompt for a language model (LM); and cause the LM to process the prompt to generate a commentary about an action performed by the one or more objects over a time interval associated with the plurality of video frames.

15. The system of claim 14, wherein the system is comprised in at least one of:

an in-vehicle infotainment system for an autonomous or semi-autonomous machine;

a system for performing one or more simulation operations;

a system for performing one or more digital twin operations;

a system for performing light transport simulation;

a system for performing collaborative content creation for 3D assets;

a system for performing one or more deep learning operations;

a system implemented using an edge device;

a system for generating or presenting at least one of virtual reality content, mixed reality content, or augmented reality content;

a system implemented using a robot;

a system for performing one or more conversational AI operations;

a system implementing one or more large language models (LLMs);

a system implementing one or more language models;

a system for performing one or more generative AI operations;

a system for generating synthetic data;

a system incorporating one or more virtual machines (VMs);

a system implemented at least partially in a data center; or a system implemented at least partially using cloud computing resources.

16. The system of claim 14, wherein the one or more processing units are further to:

process, using optical character recognition, the video segment to recognize one or more symbols pictured in the video segment, wherein the prompt for the LM is further generated using the one or more recognized symbols.

17. The system of claim 14, wherein the one or more processing units are further to:

process, using a speech recognition model, the video segment to recognize one or more speech utterances in the video segment, wherein the prompt for the LM is further generated using the one or more recognized speech utterances.

18. The system of claim 14, wherein the one or more processing units are further to:

use the generated commentary to perform at least one of:

storing the generated commentary in a computer memory;

presenting the generated commentary on a user interface; or causing at least a portion of the generated commentary to be attributed to one or more characters associated with an activity represented by the video segment.

19. The system of claim 14, wherein the one or more processing units are further to:

generate a mapping of the generated commentary to one or more timestamps of the video segment; and generate, using the generated mapping, a closed captioning for the video segment.

20. A non-transitory computer-readable storage medium storing instructions thereon that, when executed by a processing device, cause the processing device to:

sample a plurality of video frames from a video segment;

process, using a computer vision (CV) model, the plurality of video frames to obtain an output comprising:

one or more tracks for respective one or more objects pictured in the video segment, each track comprising (i) an identification of a corresponding object of the one or more objects and (ii) a location of the corresponding object in at least a subset of the plurality of video frames, and one or more of:

a description of a state of motion of the one or more objects, a description of action performed by the one or more objects, or a description of interaction between the one or more objects;

generate, using the obtained output, a prompt for a language model (LM); and cause the LM to process the prompt to generate a commentary about an action performed by the one or more objects over a time interval associated with the plurality of video frames.

* * * * *